US012585450B2

(12) United States Patent
Guo et al.

(10) Patent No.: US 12,585,450 B2
(45) Date of Patent: Mar. 24, 2026

(54) RATELESS ERASURE CODING FOR MULTI-HOP BROADCAST TRANSMISSION IN WIRELESS IoT NETWORKS

(71) Applicants: Mitsubishi Electric Research Laboratories, Inc., Cambridge, MA (US); Mitsubishi Electric Corporation, Chiyoda-ku (JP)

(72) Inventors: Jianlin Guo, Cambridge, MA (US); Jothi Prasanna Shanmuga Sundaram, Cambridge, MA (US); Toshiaki Koike Akino, Cambridge, MA (US); Pu Wang, Cambridge, MA (US); Kieran Parsons, Cambridge, MA (US); Philip Orlik, Cambridge, MA (US); Takenori Sumi, Tokyo (JP); Yukimasa Nagai, Tokyo (JP)

(73) Assignees: Mitsubishi Electric Research Laboratories, Inc., Cambridge, MA (US); Mitsubishi Electric Corporation, Tokyo (JP)

( * ) Notice: Subject to any disclaimer, the term of this patent is extended or adjusted under 35 U.S.C. 154(b) by 457 days.

(21) Appl. No.: 18/124,102

(22) Filed: Mar. 21, 2023

(65) Prior Publication Data

US 2024/0319978 A1 Sep. 26, 2024

(51) Int. Cl.
*G06F 8/65* (2018.01)
*H04L 67/00* (2022.01)

(52) U.S. Cl.
CPC ................ *G06F 8/65* (2013.01); *H04L 67/34* (2013.01)

(58) Field of Classification Search
CPC ........... H04L 67/34; H04L 65/611; G06F 8/65
See application file for complete search history.

(56) References Cited

U.S. PATENT DOCUMENTS

2014/0372585 A1* 12/2014 Hui ...................... H04L 1/0076
 709/223
2022/0201065 A1* 6/2022 Ziv ..................... H04L 12/1868

OTHER PUBLICATIONS

Carnevale, Lorenzo, et al. "Multi hop reconfiguration of end-devices in heterogeneous edge-iot mesh networks." 2021 IEEE Symposium on Computers and Communications (ISCC). IEEE, 2021. Retrieved from the Internet<https://ieeexplore.ieee.org/stamp/stamp.jsp?tp=&arnumber=9631500> (Year: 2021).*

(Continued)

*Primary Examiner* — S. Sough
*Assistant Examiner* — Cheneca Smith
(74) *Attorney, Agent, or Firm* — Gene Vinokur

(57) ABSTRACT

A network manager for delivering a firmware/software program to multi-mode nodes and single-mode nodes arranged in a multi-hop wireless IoT network. The network manager includes a transceiver configured to perform wireless communication by transmitting the encoded packets of the firmware/software program to the first-hop nodes. The network manager divides firmware/software program into source blocks, encodes the source blocks into encoded blocks based on coding scheme, packs the encoded blocks into encoded packets, and transmits the encoded packets to the first-hop nodes. The first-hop nodes may be configured to receive, decode, re-encode and re-transmit the encoded packets. The network manager keeps broadcasting the encoded packets to the first-hop nodes until a predetermined percent of the first-hop nodes receive the firmware/software program. In response to receiving a re-transmission request of missing source blocks of the firmware/software program from the first-hop nodes, the network manager re-broadcasts the missing source blocks.

20 Claims, 18 Drawing Sheets

(56) References Cited

OTHER PUBLICATIONS

Abdollahi, Mahrokh, et al. "Dynamic routing protocol selection in multi-hop device-to-device wireless networks." IEEE Transactions on Vehicular Technology 71.8 (2022): 8796-8809. Retrieved from the Internet<https://ieeexplore.ieee.org/stamp/stamp.jsp?tp=&arnumber=9769941> (Year: 2022).*

Grangetto et al. On the Fly Gaussian Elimination for LT Codes. IEEE Communications Letters. Jan. 2010.

Agha et al. Digital Fountain coding with XOR of encoded packets for broadcasting in wireless multi-hop networks using network coding. Rapport de Recherche No. 1509.

* cited by examiner

K element request vector

| 0 | 0 | 1 | ... | 1 | 0 |

1200

Class-R neighbor
1201

→ Received a re-transmission request
1202

→ Broadcast the required source blocks
1203

RATELESS ERASURE CODING FOR MULTI-HOP BROADCAST TRANSMISSION IN WIRELESS IoT NETWORKS

FIELD OF THE INVENTION

This invention relates generally to transmitting data in wireless communication networks, and particularly to multi-hop broadcast transmission in wireless IoT networks.

BACKGROUND OF THE INVENTION

As 5G/6G wireless communication technologies are emerging, the Internet of Things (IoT) applications have been rapidly increasing. As a result, IoT networks have been deployed to meet various application requirements. In an IoT network, especially outdoor IoT networks such as smart utility networks and smart city networks, there can be one or more network managers, and many other nodes such as smart meters and city traffic sensors act as data nodes to form a multi-hop network topology. Network managers organize and maintain the networks by performing management functions such as controlling data nodes, updating firmware/software, discovering routes and collecting data. In such a network as shown in FIG. 1, some nodes can directly communicate with one or more network managers and other nodes can't directly communicate with any network manager and therefore, the communications need to be relayed in a multi-hop fashion.

In an IoT network, there can be three types of traffic: (1) downlink traffic from network managers to data nodes, (2) uplink traffic from data nodes to network managers and (3) peer-to-peer traffic from data nodes to data nodes. The uplink traffic is typically for data collection such as metering data collection in a smart meter network. The peer-to-peer traffic is mainly for information sharing such as neighbor information exchange in neighbor discovery and route discovery. The downlink traffic is generally for management command and firmware/software update. The uplink and peer-to-peer traffic have been widely studied. The downlink traffic has not been well studied. The present invention addresses issues of downlink traffic distribution in multi-hop wireless IoT networks by providing innovative mechanisms.

The downlink traffic is more important than uplink traffic and peer-to-peer traffic because downlink traffic is about network operation. A malfunctioning network may not provide correct information. For example, if an application requires network to perform a new function such as machine learning, the network managers need to distribute a new firmware/software to all data nodes in the network. Upon receiving new firmware/software, the data nodes can then perform the new function required. If such firmware/software distribution fails, data nodes cannot perform new function. Therefore, installing new firmware/software and updating existing firmware/software are critical.

In addition, it is expensive to completed replace the deployed devices with new devices. Therefore, the feasible solution is to update deployed devices with new capabilities. As a result, the firmware/software distribution becomes inevitable in modern IoT networks.

To install or update firmware/software, the firmware/software programs must be delivered to all data nodes in the network. FIG. 2A shows an example of conventional flooding firmware/software distribution in multi-hop wireless IoT networks, in which network manager (NM) as firmware/software program source initiates the distribution via broadcast transmission. Upon receiving firmware/software program from network manager, the $1^{st}$ hop nodes re-broadcast the received firmware/software program to propagate the distribution to the $2^{nd}$ hop nodes. Upon receiving firmware/software program from the $1^{st}$ hop nodes, the $2^{nd}$ hop nodes again re-broadcast the received firmware/software program. This flooding broadcast process continues until all data nodes in the network receive firmware/software program. If any node fails to receive firmware/software program, the node will send a re-transmission request to network manager. Upon receiving the request, network manager re-sends the firmware/software program to request node as shown in FIG. 2B.

Note that the firmware/software program is typically large in size and cannot be packed into one network packet. Therefore, network manager can divide firmware/software data into multiple packets and broadcasts multiple data packets.

There are several key issues in conventional flooding distribution approach that need to be addressed: (1) Redundant transmission: Communication bandwidth is limited. However, the conventional flooding distribution approach is not efficient, in which all data nodes re-broadcast the received firmware/software program no matter neighbors already received the program or not. In fact, if all neighbors have already received firmware/software program, a data node does not need to re-transmit the received firmware/software packets. (2) Unreliable transmission: In wireless communication networks, there are many factors that can cause packet transmission failure. FIG. 5 shows two typical cases in CSMA based communication networks: (a) CSMA collision: wireless IoT networks typically employ CSMA channel access mechanism, in which packet collision is unavoidable, and (b) Poor link quality: a wireless link can be blocked by objects, e.g., in an outdoor IoT network, the wireless link can be blocked moving vehicles on a heavy traffic road. In such cases, the firmware/software program may not be distributed successfully. Therefore, transmission reliability needs to be improved. (3) Inefficient request and response: In wireless networks, there is no guarantee that a transmission is successful. Therefore, the re-transmission request needs to be sent. The conventional request/response process is time consuming and communication bandwidth inefficient due to multi-hop relay mechanism. This request/response approach can also cause network traffic congestion, packet loss and packet delay. (4) Lack of acknowledgement: Due to broadcast transmission nature, there is no acknowledgement in communication layers. Therefore, the transmitting node does not know whether the firmware/software packets are received by its neighbors. Accordingly, an acknowledgement method needs to be provided. (5) Lack of network condition consideration: The noise environment can degrade communication link quality. IoT networks are typically deployed in noise environment, where link quality varies dynamically and can be poor. Transmitting packets over poor link quality need additional mechanism. However, network condition has not been considered in conventional distribution approach. (6) Lack of node capability consideration: The advanced node capability can improve the distribution efficiency. The multi-mode nodes are present in IoT networks. For example, in smart meter networks, different generations of smart meters co-exist. The new generation meters are more capable than old generation meters. The multi-mode nodes can transmit packets using the modulation adaptation with higher transmission rates. Therefore, fully utilizing multi-mode nodes can improve distribution efficiency. However, the multi-mode node has not been considered by conventional distribution approach.

Accordingly, it is desirable to provide more efficient and more reliable firmware/software distribution methods for multi-hop IoT networks to reduce the number of redundant transmissions efficiency by providing an innovative multi-hop relay protocol and an acknowledgement mechanism for broadcast transmission, improve packet transmission reliability by fully considering dynamic wireless network conditions, and speed up firmware/software distribution vis fully utilizing the presence of multi-mode nodes.

SUMMARY OF THE INVENTION

Some embodiments of the invention are based on recognition that the downlink firmware/software distribution is needed in multi-hop IoT networks, in which at least one network manager manages tens or hundreds or thousands of data nodes and at least one data node cannot directly communicate with the network manager. The conventional firmware/software distribution starts from networks managers and propagate to data nodes in a multi-hop fashion, where the network managers may divide firmware/software data into multiple data packets and broadcast the data packets to the 1-hop data nodes, which then re-broadcast the received data packets to propagate distribution to the 2-hop data nodes. This process continues until all data nodes receive firmware/software. If any data node does not receive any packet, the data node will unicast a request packet to a network manager via hop-by-hop relay. Upon receiving request, the network manager then unicasts the missing data packet to the request node via hop-by-hop relay. Such flooding firmware/software distribution approach has several issues to be addressed including: (1) distribution inefficiency, (2) unreliable transmission, (3) request and response inefficiency, (4) lack of acknowledgement mechanism, (5) lack of network condition consideration and (5) lack of multi-mode node consideration.

It is one object of various embodiments of the invention to provide an efficient multi-hop broadcast transmission protocol named dynamic relay point (DRP) protocol to efficiently deliver firmware/software in multi-hop wireless IoT networks. The protocol consists of five key functions: 1) a dynamic neighbor classification method, 2) a passive/active acknowledgement mechanism, 3) a packet scheduling method, 4) a hybrid packet transmission mechanism, and 5) a network condition based rateless erasure coding scheme.

To that end, each node in the network dynamically classifies its neighbors into two classes: (1) Class-R neighbors, which are neighbors that have received firmware/software program and (2) Class-U neighbors, which are neighbors that have not received firmware/software yet, wherein the having received firmware/software program is defined as all firmware/software packets have been successfully received and the having not received firmware/software program is defined as at least one firmware/software packet is still missing. The Class-R set and Class-U set are updated dynamically. Initially, a node classifies all its neighbors except network manager as Class-U neighbors, the network manager is classified as Class-R neighbor by its neighbors. As firmware/software distribution proceeds, if a node overhears an acknowledgement from a Class-U neighbor via a hybrid acknowledgement method, it re-classifies that neighbor as Class-R neighbor.

Accordingly, some embodiments of the invention provide a passive/active acknowledgement mechanism, wherein the transmission of a firmware/software packet servers as a passive acknowledgement and the transmission of a broadcast acknowledgement packet serves as an active acknowledgement. Unlike conventional acknowledgement packet that is unicasted, the embodiments of the invention provide a broadcast acknowledgement to cope the broadcast transmission.

Some embodiments of the invention are based on recognition that reducing redundant transmissions and firmware/software distribution latency is critical. Therefore, a node with more Class-U neighbors and good link quality should re-transmit firmware/software packet earlier to speed up the distribution. In other words, a node with fewer Class-U neighbors or poor link quality should re-transmit firmware/software packet later to give transmission opportunity to other nodes.

To that end, the network managers broadcast firmware/software packet without delay and all data nodes re-broadcast the firmware/software packet with delay.

Accordingly, some embodiments of the invention provide a distributed transmission delay calculation mechanism, in which a data node computes transmission delay based on the number of Class-U neighbors and its link qualities to those Class-U neighbors such that the transmission delay is inversely proportional to the number of Class-U neighbors and link qualities to the Class-U neighbors.

Some embodiments of the invention are based on recognition that upon receiving firmware/software program, to reduce redundant transmission, a node re-broadcasts the firmware/software packet only if it has at least one Class-U neighbor. Otherwise, the node does not re-broadcasts firmware/software packet, but broadcasts an acknowledgement packet instead.

Some embodiments of the invention are based on recognition that the firmware/software must be delivered to all data nodes in the network.

To that end, if any data node does not receive firmware/software program, the data node will unicast a re-transmission request packet to a selected Class-R neighbor. Upon receiving the request, the Class-R neighbor will perform network manager role by broadcasting the firmware/software packets requested. Even the request is unicasted, the response is broadcasted to benefit more data nodes.

Some embodiments of the invention are based on recognition that the dynamic network conditions such as link quality in a wireless IoT network varies dynamically due to many factors such as noise, collision, interference, etc. Transmitting packet over poor link quality links is unreliable due to packet loss or packet error. Therefore, it is necessary to provide a method for poor link quality nodes to improve packet transmission reliability.

Additionally, some embodiments of the invention are based on recognition that IoT devices are typically resource constrained. As a result, the transmission reliability improvement method must be lightweight.

To that end, some embodiments of the invention provide the Luby Transform (LT) based lightweight coding schemes for the poor link quality nodes to improve packet transmission reliability, in which poor link quality nodes encode firmware/software packets by adding redundancy. The amount of the redundancy added is based on number of Class-U neighbors and link qualities to Class-U neighbors. The poorer link quality is, the more redundancy is added. The more Class-U neighbors are, the more redundancy is added.

Additionally, some embodiments of the invention provide a hybrid packet transmission mechanism for multi-hop firmware/software distribution in wireless IoT networks, in which if a node has good link qualities to its Class-U neighbors, the re-broadcasts firmware/software packets without coding, i.e., the node re-broadcasts the simple firmware/software packets. Otherwise, the node re-broadcasts firmware/software packets with coding, i.e., re-broadcasts the encoded firmware/software packets.

Some embodiments of the invention are based on recognition that conventional LT coding is designed for end-to-end topology from an encoder to a decoder without considering multi-hop broadcast topology. In conventional LT coding, the encoder continues the encoded packet transmission until an acknowledgement is received from the decoder. Therefore, it is not feasible for multi-hop broadcast transmission in IoT networks, in which a node can receive firmware/software packets from multiple Class-R neighbors. Therefore, a node does not need to ensure the firmware/software program reception by all its Class-U neighbors, especially poor link quality Class-U neighbors.

Accordingly, some embodiments of the invention provide a firmware/software packet transmission mechanism, in which if a node sees an R percent (R %) of its Class-U neighbors have received firmware/software program, it stops firmware/software packet transmission. This stopping mechanism is based on the fact that in broadcast environment, a node can receive firmware/software packets from multiple Class-R neighbors instead of a single transmitter in conventional LT coding. The stopping transmission can improve communication bandwidth efficiency by avoiding packet transmission over poor link quality links.

Further, some embodiments of the present invention provide a network manager for delivering a firmware/software program to multi-mode nodes and single-mode nodes arranged in a multi-hop wireless IoT network. The network manager includes a transceiver configured to perform wireless communication by transmitting encoded data packets of the firmware/software program to the first-hop nodes, wherein the first-hop nodes are configured to directly communicate with the network manager, wherein other nodes except the first-hop nodes are named as other-hop nodes; at least one processor in association with the transceiver; and a memory having the firmware/software program and instructions stored thereon that cause the at least one processor to: divide the firmware/software program into firmware/software program source blocks; encode the firmware/software program source blocks into encoded blocks based a rateless erasure coding scheme; pack the encoded blocks into encoded data packets; transmit, based on dynamic relay point (DRP) protocol, the encoded data packets to the first-hop nodes, wherein the first-hop nodes are configured to receive the encoded data packets, decode the encoded data packets received, re-encode the firmware/software program source blocks and re-transmit the encoded data packets to propagate firmware/software distribution to the other-hop nodes, wherein the network manager keeps broadcasting the encoded data packets to the first-hop nodes until an R percent (R %) of the first-hop nodes completes to receive a whole of the firmware/software program; and re-broadcast missing source blocks to the first-hop nodes in response to receiving a re-transmission request of the missing source blocks of the firmware/software program from the first-hop nodes.

According to some embodiments of the present invention, a multi-mode node is provided for delivering a firmware/software program over a multi-hop wireless IoT network including a network manager, other multi-mode nodes and single mode nodes. The multi-mode node includes a transceiver configured to perform wireless communication with neighbors including the network manager, the other multi-mode nodes and the single mode nodes by receiving encoded packets of the firmware/software program from the network manager and transmitting the encoded firmware/software program source blocks to the other multi-mode nodes and the single mode nodes; at least one processor in association with the transceiver; and a memory having instructions stored thereon that cause the at least one processor to: classify the neighbors into Class-R neighbors and Class-U neighbors, wherein the Class-R neighbors are neighbor nodes that have received a whole of the encoded packets of the firmware/software program, wherein the Class-R neighbors are neighbor nodes that have received a whole of firmware/software program source blocks successfully decoded from the encoded source blocks received, wherein the Class-U neighbors are neighbor nodes that have not received the whole of the firmware/software program source blocks, wherein the Class-U neighbors have at least one of the firmware/software program source blocks missing, wherein all neighbors except the network manager are initially classified as the Class-U neighbors, wherein the network manager is classified as a Class-R neighbor by its neighbors, wherein the at least one processor re-classifies the Class-U neighbors into the Class-R neighbors based on an hybrid acknowledgement method.

Additionally, to make sure data nodes successfully receive firmware/software, some embodiments of the invention provide a timer mechanism, in which a data node starts a timer when it receives the first firmware/software packet. If the timer is up and the node still misses some firmware/software packets, it sends a re-transmission request to a selected Class-R neighbor to re-transmit the missing firmware/software packets.

Some embodiments of the invention are based on recognition that the multi-mode devices can be present in a modern IoT network. A high transmission rate link takes less time to transmit a packet than a low transmission rate link does.

Additionally, some embodiments of the invention provide a mode adaptive transmission method such that if a node is a multi-mode node and all its Class-U neighbors are multi-mode nodes, the node re-broadcasts firmware/software packets using higher transmission rate mode.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

DETAILED DESCRIPTION OF THE PREFERRED EMBODIMENTS

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Figure 1:
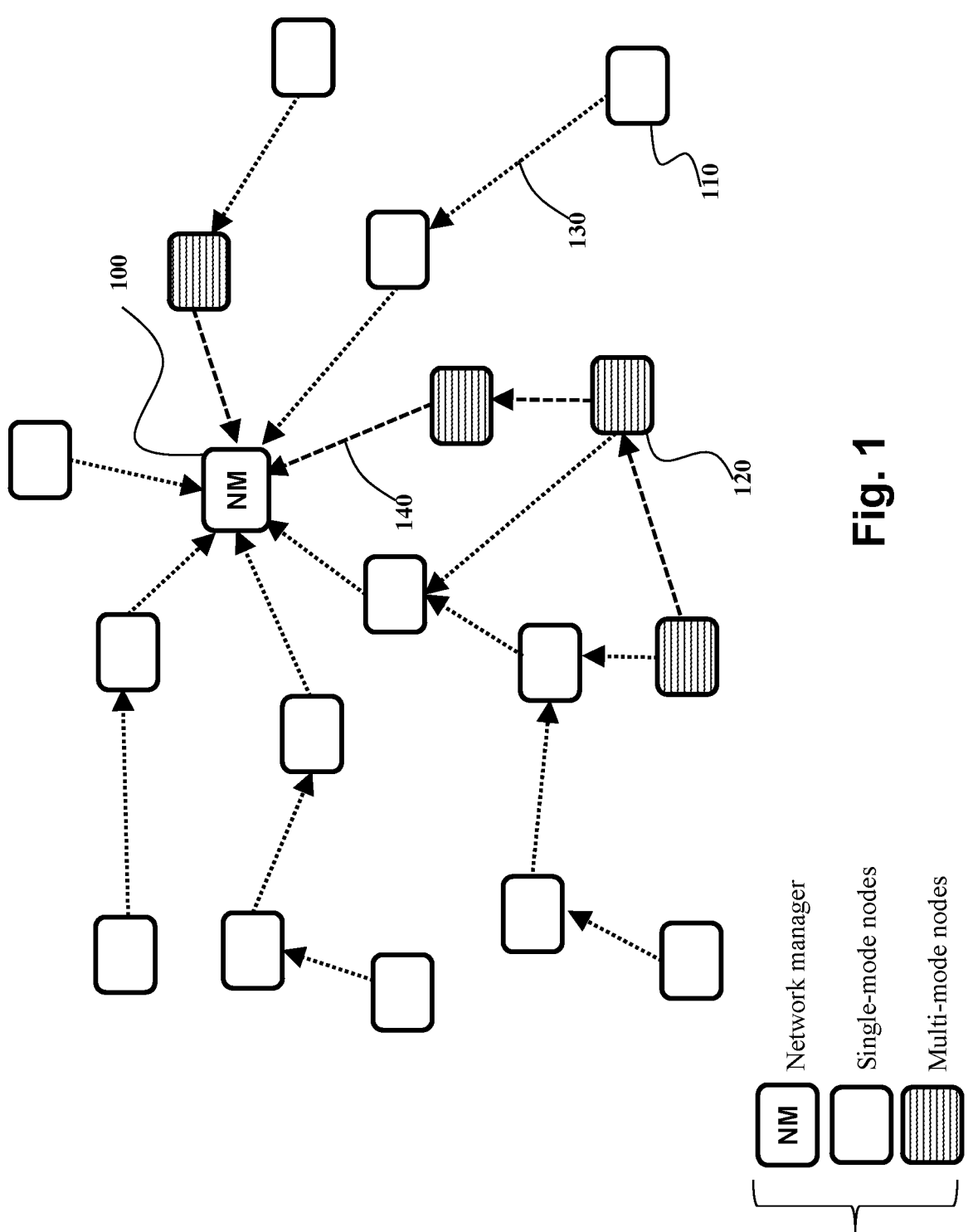
FIG. 1 is schematic of multi-hop wireless IoT network consisting of a network manager, multiple multi-mode nodes and multiple single-mode nodes.

The Internet of Things (IoT) applications have been rapidly increasing. IoT networks have been deployed to meet various application requirements. In an IoT network, there can be one or more network managers and hundreds of data nodes to form a multi-hop network topology. FIG. 1 shows an example of multi-hop IoT network, which includes one network manager 100, a set of single-mode nodes 110 and a set of multi-mode nodes 120. The single-mode links 130 transmit using low data rate mode and multi-mode links 140 can transmit using low data rate mode or high data rate mode. Some data nodes can directly communicate with network manager and the rest of nodes can't directly communicate with network manager and therefore, the communications need to be relayed in a multi-hop fashion.

In modern IoT networks, besides control and management commands, the firmware/software installation and update are inevitable. Such firmware/software data distributions are downlink traffic from network managers to data nodes. The downlink data traffic is important to maintain normal operation of the IoT networks.

However, the conventional flooding firmware/software distribution in multi-hop IoT networks is inefficient. FIG.

Figure 2A:
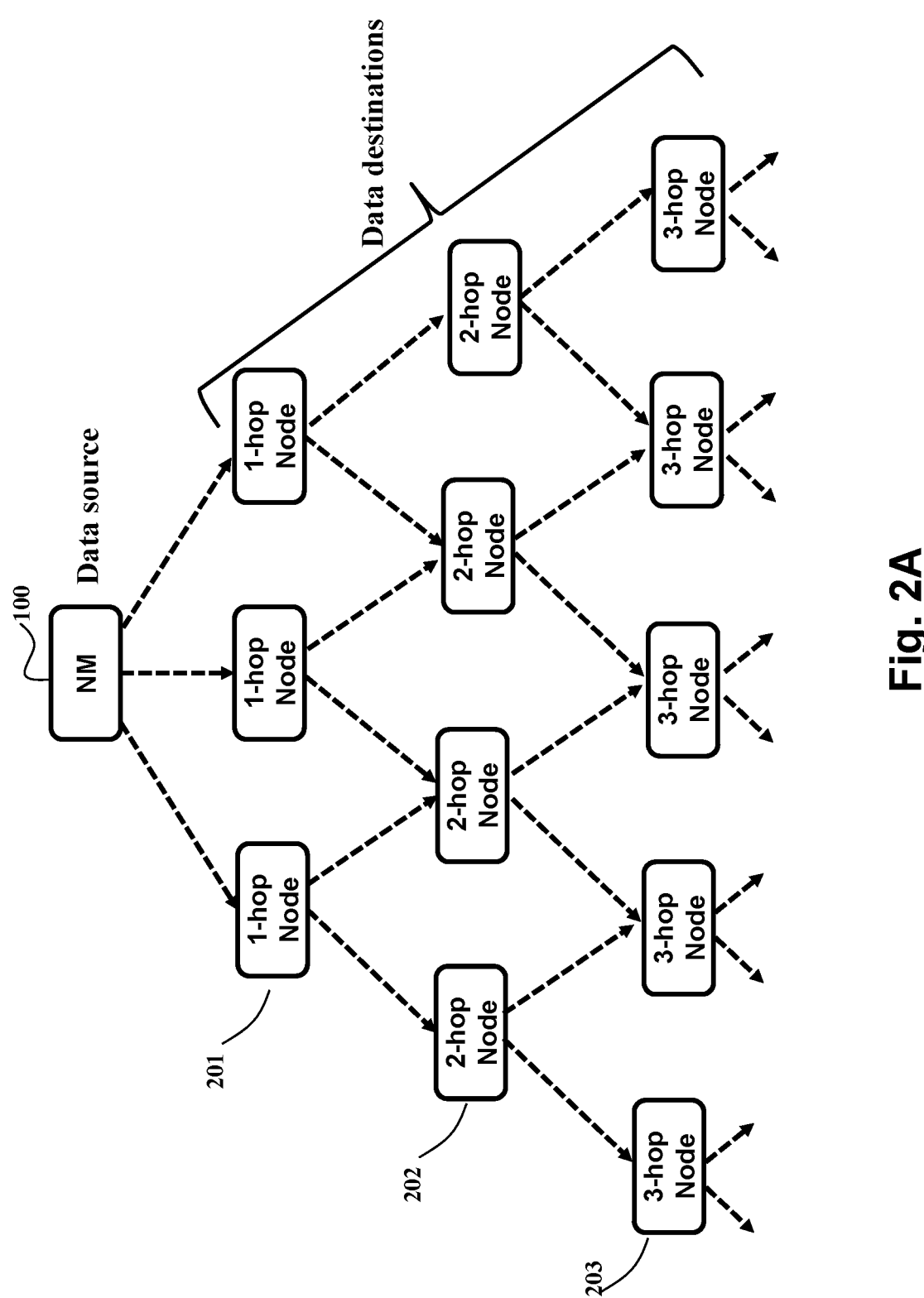
FIG. 2A shows an example of conventional firmware/software distribution in a multi-hop wireless IoT network via hop-by-hop relay, where network manager serves a data source and other nodes serve as data destinations.
Figure 2B:
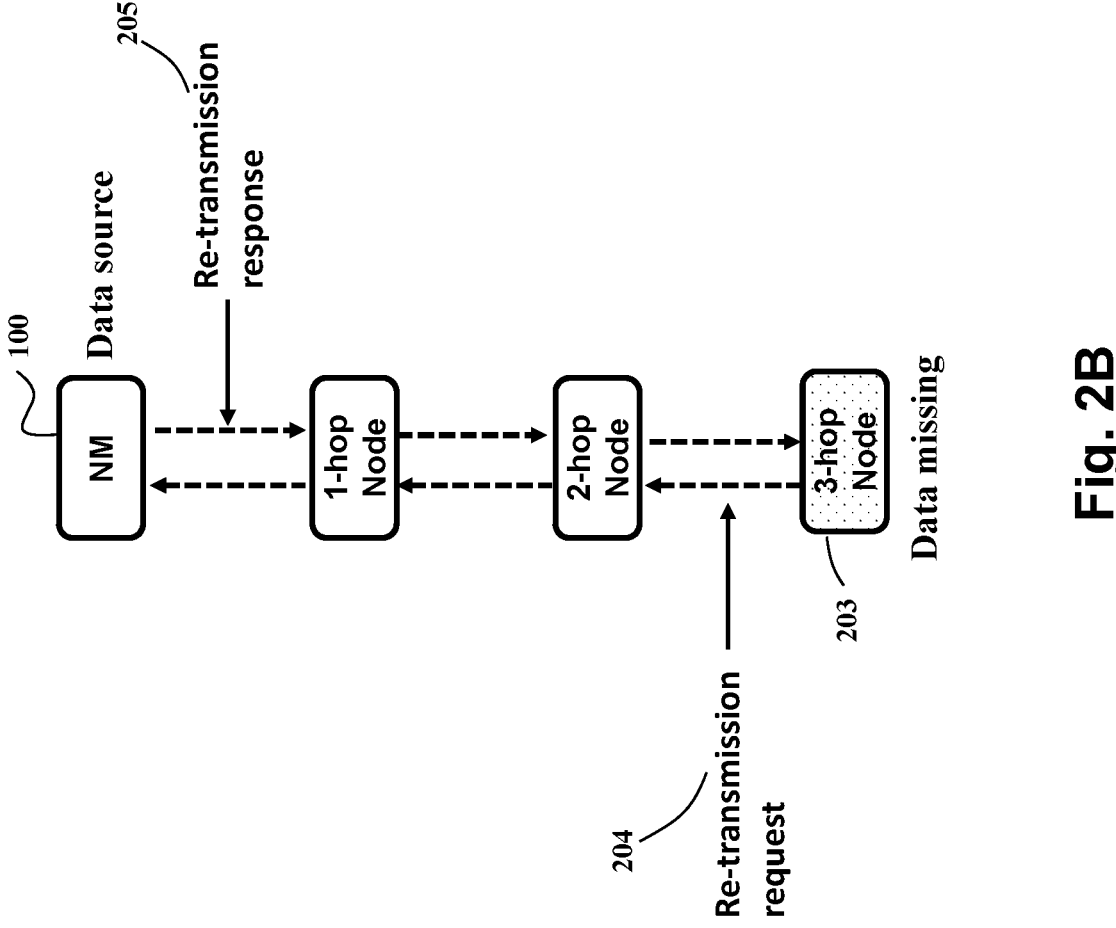
FIG. 2B shows an example of conventional re-transmission request and response process when data distribution fails to reach a node.

2A shows an example of conventional firmware/software distribution in multi-hop wireless IoT networks, in which network manager (NM) 100 is the firmware/software data source and data nodes are firmware/software data destinations. Network manager initiates the firmware/software distribution via broadcast transmission. Upon receiving firmware/software from network manager, the 1-hop nodes 201 re-broadcast the received firmware/software to propagate the distribution to the 2-hop nodes 202. Upon receiving firmware/software from the 1-hop nodes 201, the 2-hop nodes 202 re-broadcast the received firmware/software to propagate the distribution to the 3-hop nodes 203. This flooding broadcast process continues until all nodes in the network receive firmware/software. If any node fails to receive firmware/software, the node will send a re-transmission request to network manager and network manager then re-sends the firmware/software to request node as shown in FIG. 2B, where a 3-hop node 203 does not receive the firmware/software, it sends a re-transmission request packet 204 to network manager 100. This re-transmission request packet is relayed hop-by-hop to network manager 100, which then responds with a re-transmission response packet 205. Similarly, the response packet 205 is relayed hop-by-hop to the 3-hop node 203.

There are several issues in conventional flooding distribution approach: (1) redundant transmission, (2) unreliable transmission, (3) inefficient request and response, (4) lack of acknowledgement, (5) lack of network environment consideration, and (6) lack of multi-mode node capability consideration.

A firmware/software program is typically large in the size and cannot be packed into one data packet. Therefore, a firmware/software program is typically divided into multiple blocks, packed and transmitted in multiple data packets. As a result, there are different ways for data nodes to re-broadcast firmware/software data packet: 1) re-broadcast when all packets are received, 2) re-broadcast a packet once a packet is received, 3) other ways. The present invention uses method 1) as an example to illustrate description because it gives intermediate data nodes opportunity to re-encode firmware/software packets based on dynamic networks conditions they have observed.

Dynamic Relay Point (DRP) Protocol for Efficient Broadcast Transmission in Multi-Hop IoT Networks An efficient transmission method name Dynamic Relay Point (DRP) protocol is provided to address inefficiency issue in conventional distribution. The key function of DRP is to reduce number of redundant firmware/software packet transmissions and improve firmware/software packet transmission reliability.

Figure 3:
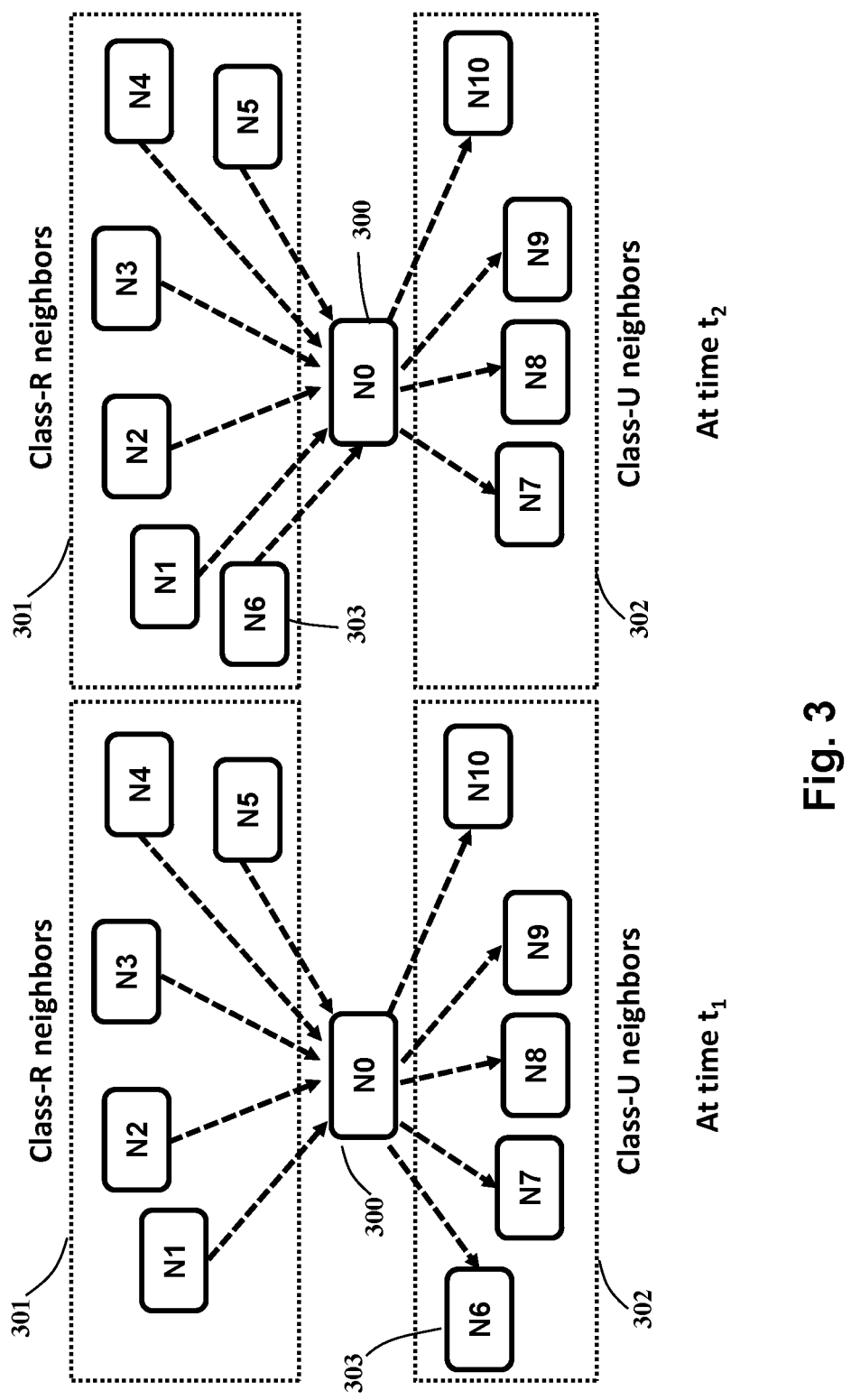
FIG. 3 illustrates an example of dynamic neighbor classification according to some embodiments of an invention, in which node N6 is a Class-U neighbor of node N0 at time $t_1$ and node N6 is re-classified as a Class-R neighbor of node N0 at time $t_2$.

Firstly, to make efficient transmission, a dynamic neighbor classification method is provided such that the nodes classify their neighbors into two dynamic classes: (1) Class-R set, which contains the neighbors that have received all firmware/software packets and (2) Class-U set, which contains the neighbors that have not received all firmware/software packets. Initially, each node classifies all its neighbors except the network manager as Class-U neighbors, the network manager is classified as Class-R neighbor by its neighbors. As firmware/software distribution process proceeds, the Class-R set and Class-U set are dynamically updated. Each node monitors the packet transmission from its Class-U neighbors. If a node overhears a firmware/software packet from a Class-U neighbor for the first time, it re-classifies that neighbor as a Class-R neighbor. Besides firmware/software packet, if a node overhears a broadcast acknowledgement packet from a Class-U neighbor, it also re-classifies that neighbor as a Class-R neighbor. FIG. 3 illustrates dynamic neighbor set update, where node N0 300 has its Class-R set 301 and Class-U set 302. At time $t_1$, node N6 303 is in Class-U set of node N0 and however, at time $t_2$, the node N6 303 has been re-classifies as a Class-R neighbor, and therefore, has been moved from Class-U set to Class-R set.

There are many existing neighbor discovery methods that can be used to discover neighbors. For example, a node broadcasts a neighbor discovery request packet and neighbors unicast a neighbor discovery response packet back or neighbors can be discovered during route discovery process.

Secondly, to make efficient transmission, an acknowledgement method is provided for broadcast transmission, in which all nodes including network manager monitor their neighbor's packet transmissions. The acknowledgement is realized in a hybrid way: (1) Passive acknowledgement: the transmission of the firmware/software packet by a node indicates that node's reception of firmware/software program, and therefore, the transmission of the firmware/software packet serves as a passive acknowledgement. (2) Active acknowledgement: a node broadcasts an actual acknowledgement packet when it receives firmware/software program, and this broadcast acknowledgement packet serves as an active acknowledgement. Based on the provided passive/active acknowledgement mechanism, upon receiving firmware/software program, a data node re-broadcasts firmware/software packets only if the node has at least one Class-U neighbor. Otherwise, the data node broadcasts an acknowledgement packet.

Thirdly, for firmware/software distribution in multi-hop wireless IoT networks, nodes contend for channel access using CSMA mechanism, where there is no guarantee which node transmits early, and which node transmits later. However, it is desirable that the node with more Class-U neighbors and good link quality relays firmware/software program earlier and the node with fewer Class-U neighbors or poor link quality relays firmware/software later.

Figure 4A:
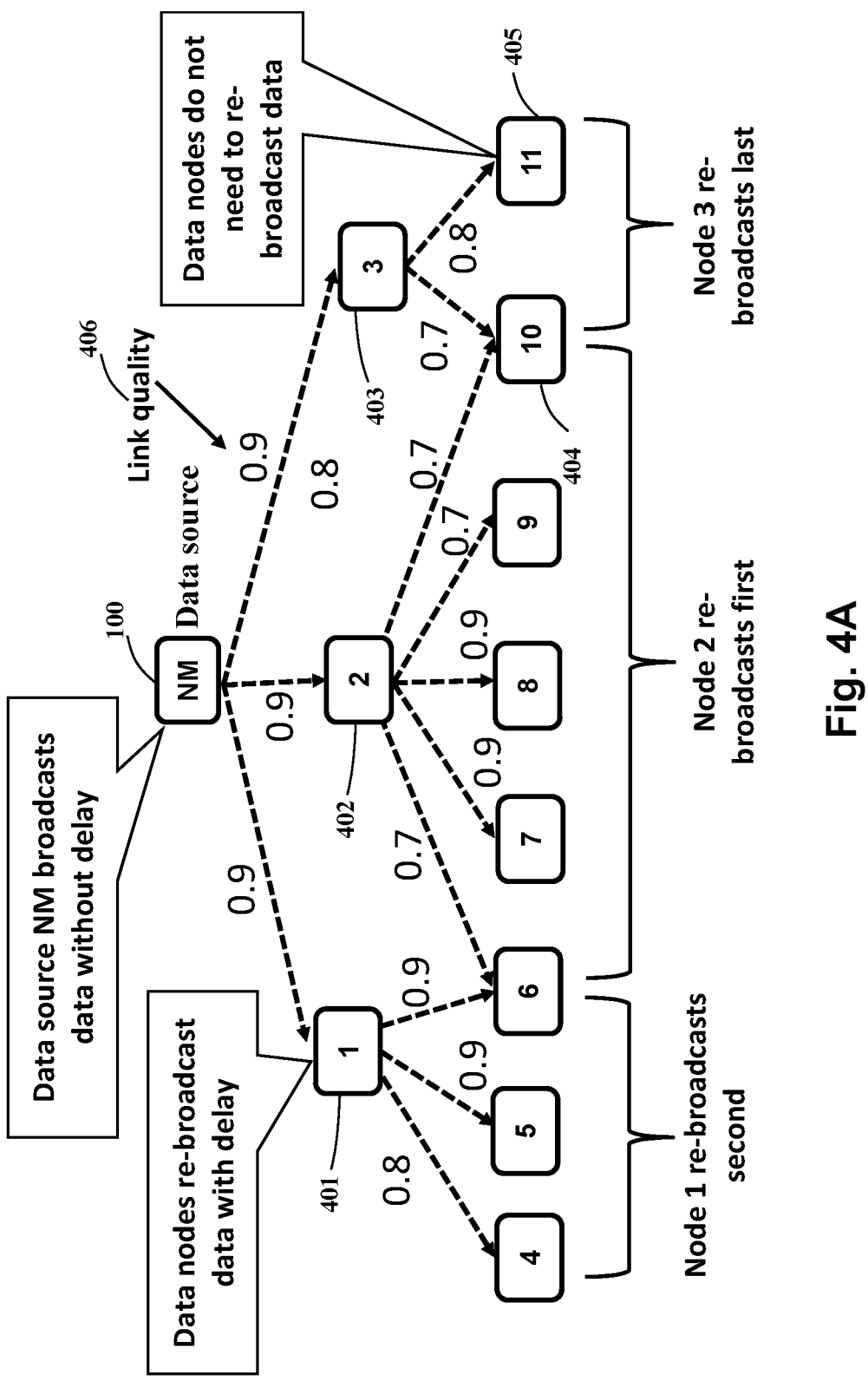
FIG. 4A depicts efficient broadcast data distribution method according to some embodiments of an invention, where network manager broadcasts firmware/software packet without delay, data nodes re-broadcast firmware/ software packet with the delay computed based on number of Class-U neighbors and the link qualities to Class-U neighbors.

The provided DRP protocol instructs nodes for packet transmission. The mechanism is illustrated in FIG. 4A, a two-hop network, where network manager (NM) 100 as firmware/software program source starts firmware/software packets broadcast without scheduling delay. Since link qualities 406 from network manager to nodes 1 401, node 2 402 and node 3 403 are 0.9, which is good link quality. Therefore, nodes 1, 2 and 3 receive firmware/software from network manager 100 at same time. Upon receiving data packets from network manager, nodes 1, 2 and 3 need to re-broadcast firmware/software packets with scheduling delay since they all have Class-U neighbors, e.g., nodes 4, 5, and 6 are Class-U neighbors of node 1. However, which of them should re-broadcast first, second and last?

A distributed scheduling delay computation method is provided to compute scheduling delay by a node n based on the number of Class-U neighbors and link qualities to those Class-U neighbors as follows $$D(n) = \frac{\text{Time unit}}{N_U(n) * \sum_{i=1}^{N_U} q_t(i)}, \qquad (1)$$

where time unit can be μs, ms, etc., $N_U(n)$ is the number of Class-U neighbors of node n and $q_t(i)$ is the link quality from node n to its Class-U neighbor i at time t. Equation (1) indicates that a node's scheduling delay is inversely proportional to the number of Class-U neighbors and link qualities to Class-U neighbors. If a node has larger Class-U set with good link qualities, this node should re-broadcast firmware/software packets early so that firmware/software packets can be reliably delivered to more Class-U nodes and these nodes will in turn re-broadcast firmware/software packets early to speed up distribution propagation. Otherwise, if a node has smaller Class-U set or poor link qualities, this node should broadcast later because fewer Class-U nodes will receive firmware/software packets or firmware/software packets may be lost due to poor link quality.

As shown in FIG. 4A, node 1 has three Class-U neighbors 4, 5 and 6, therefore $N_U(1)=3$, and the link qualities from node 1 to its Class-U neighbors 4, 5 and 6 are 0.8, 0.9 and 0.9, respectively. Take ms as time unit, then D(1)=0.1282 ms, similarly, D(2)=0.0513 ms and D(3)=0.3333 ms. Therefore, node 2 should re-broadcast firmware/software packet first, node 1 should re-broadcast second and node 3 should re-broadcast last. Upon receiving firmware/software packets from nodes 1, 2 and 3, network manager takes receptions as passive acknowledgement and therefore, moves them from Class-U set to Class-R set. Similarly, upon receiving firmware/software packets from node 2, nodes 6, 7, 8, 9 and 10 update their Class-R and Class-U sets by moving node 2 from Class-U set to Class-R set. As a result, nodes 7, 8 and 9 have no Class-U neighbor. Thus, they broadcast an acknowledgement packet instead of firmware/software packet. Once node 2 receives acknowledgements, it moves nodes 7, 8 and 9 from Class-U set to Class-R set. However, nodes 6 and 10 still have node 1 and node 3 as their Class-U neighbor, respectively. Therefore, they will re-broadcast firmware/software packets and nodes 1 and 3 will move nodes 5 and 10 from Class-U set to Class-R set, respectively. Similar procedure can be applied to node-1 branch and node-3 branch.

It should be noticed that a leaf node may need to re-broadcast firmware/software packets instead of acknowledgement packet. For example, node 10 404 is a leaf node, but when it receives firmware/software packets from node 2, node 3 does not start broadcast yet. As a result, node 3 is still a Class-U neighbor of node 10 and therefore, it should re-broadcast firmware/software packets instead of acknowledgement packet. However, situation for leaf node 11 405 is different. When node 11 receives firmware/software packets from node 3, it has no Class-U neighbor. Therefore, it should broadcast an acknowledgement packet instead of firmware/software packets.

The provided efficient transmission mechanism also avoids the unnecessary data packet transmission via provided acknowledgement mechanism. Transmitting a small acknowledgement packet is much more efficient than transmitting entire firmware/software program.

Link quality can be expressed in different ways such as expected transmission count (ETX) and received signal strength indicator (RSSI). It is an implementation option to select link quality representation and compute link quality since it is a well-studied topic.

Figure 4B:
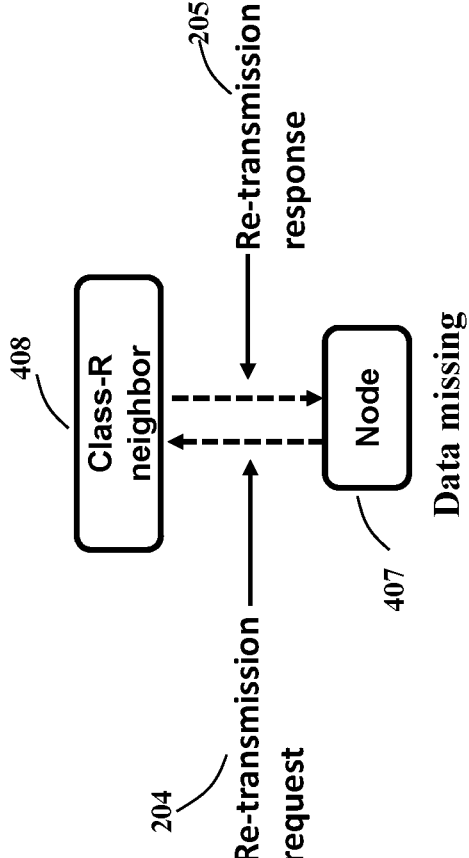
FIG. 4B shows efficient re-transmission request and response method according to some embodiments of an invention, where a node that fails to receive firmware/ software program sends a re-transmission request to a selected Class-R neighbor instead of the network manager.

FIG. 4B shows the provided request and response mechanism, in which a node 407 that fails to receive firmware/software packets will send a re-transmission request 204 to a selected Class-R neighbor 408 instead of network manager and Class-R neighbor 408 will play network manager role by sending re-transmission response 205 to request node. This mechanism is a 1-hop transmission, it reduces distribution delay and communication bandwidth requirement, especially for large scale IoT networks.

There are different ways to select a Class-R neighbor. For example, one option is to select a Class-R neighbor with the best link quality and another option is to select a Class-R neighbor via a routing protocol such as default parent in RPL routing protocol.

Figure 5:
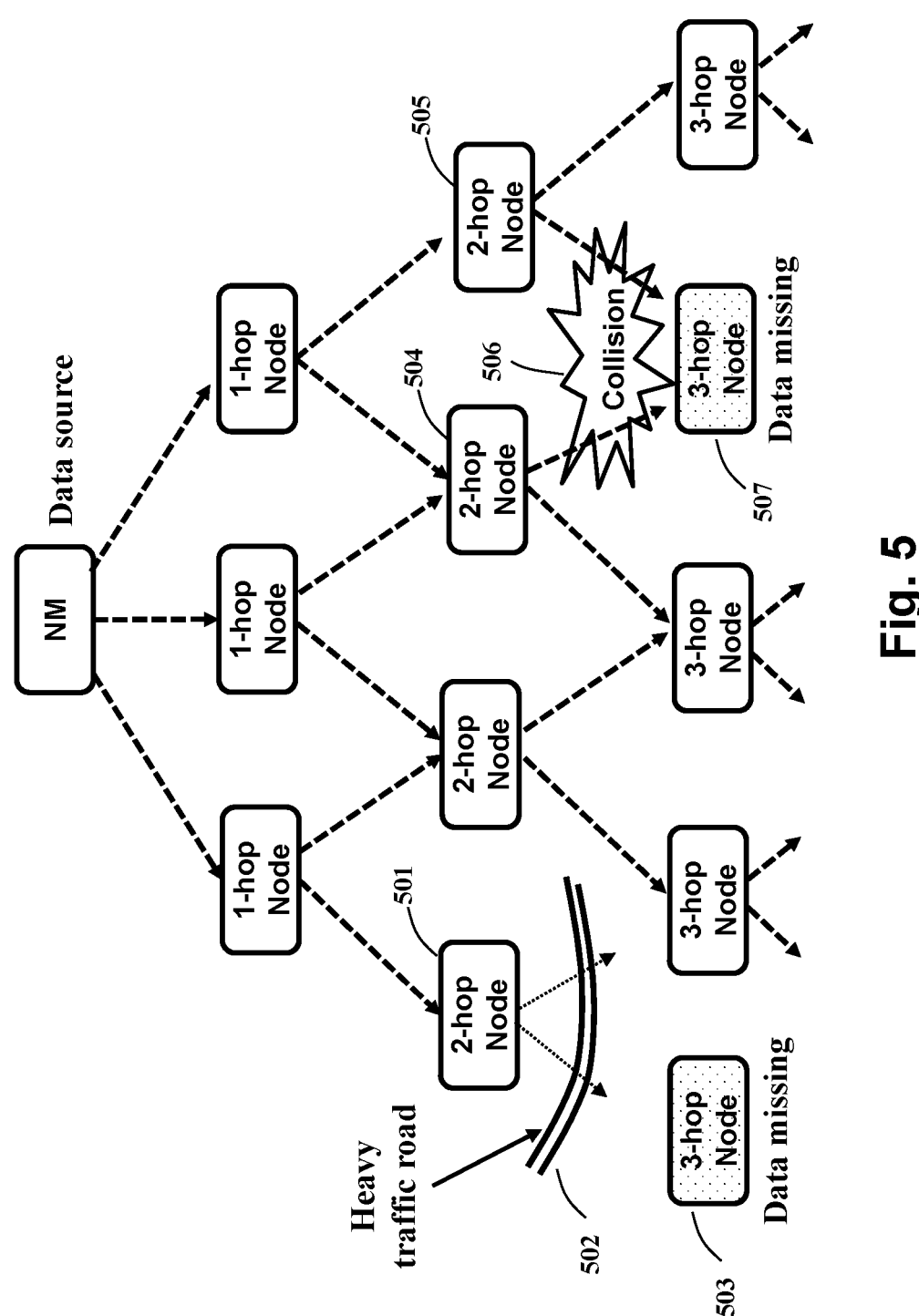
FIG. 5 shows an example of packet transmission failure caused by road traffic and packet collision in a multi-hop IoT network.

Dynamic Network Condition Based Rateless Erasure Coding Scheme for Firmware/Software Distribution Reliability Improvement in Noise Multi-Hop Wireless IoT Networks In wireless communication networks, there are many factors that can cause packet transmission failure. FIG. 5 shows two typical cases in CSMA based communication networks: (a) Poor link quality: a wireless link can be blocked by objects. For example, in an outdoor IoT network, the wireless link can be blocked moving vehicles on a heavy traffic road 502. As a result, the 3-hop node 503 can't receive firmware/software packets from 2-hop node 501. (b) CSMA collision: wireless IoT networks typically employ CSMA channel access mechanism, in which packet collision is unavoidable, e.g., transmissions from 2-hop 504 and 2-hop 505 collide 506, thus 3-hop node 507 does not receive firmware/software. In such cases, the firmware/software program may not be distributed successfully. Therefore, transmission reliability needs to be improved.

Coding techniques have been widely applied to improve transmission reliability in lossy wireless networks. However, unlike conventional powerful devices such as computers, the IoT devices are typically with constrained computation resources. Therefore, designing lightweight coding techniques are critical for IoT networks.

There are different types of coding techniques including network coding and rateless erasure coding. Although network coding is more flexible than rateless erasure coding, it is not practical for IoT devices due to the higher complexity. Rateless erasure coding is more feasible for wireless IoT networks due to the lower complexity. Luby Transform (LT) codes and Raptor codes are two popular rateless erasure codes, which are candidate coding schemes for IoT devices. LT as the base of rateless erasure codes with only XOR operation fits IoT devices better.

Figure 6A:
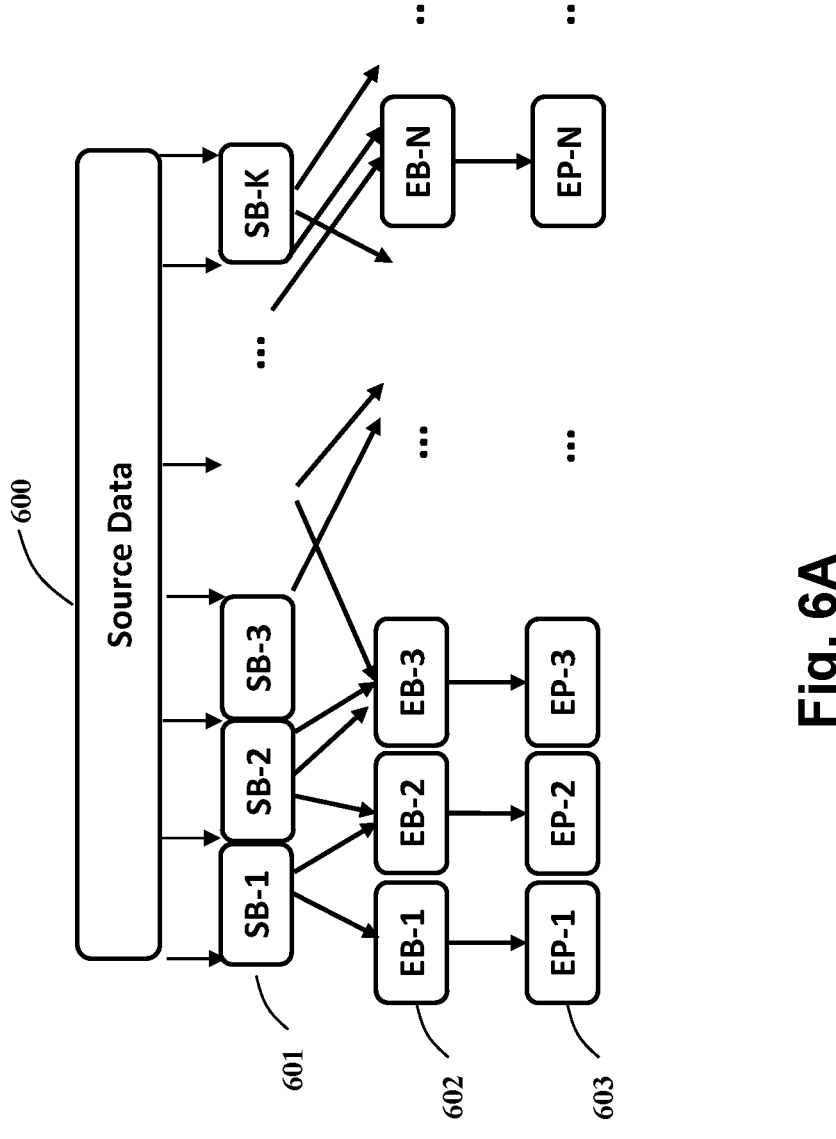
FIG. 6A illustrates the bipartite graph of the conventional Luby Transform coding to generate the encoded packets (EPs) from source blocks (SBs)

FIG. 6A illustrates encoding process of conventional LT codes, where source data 600 to be transmitted is divided into equal size source blocks (SBs) 601, which are used to generate the encoded blocks (EBs) 602 with same size as SBs via the exclusive-or (XOR) operation. The encoded blocks 602 are then packed into network packets as payload together with headers as shown in FIG. 10B. The constructed network packets are known as the encoded packets (EPs) 603 to be transmitted into the network. More specifically, to generate an EB, LT randomly chooses a degree d, i.e., number of SBs to be used, for the EB from a degree distribution. LT then chooses uniformly at random d distinct SBs as input blocks of the EB. The value of the EB is the XOR of the d neighbors. For example, the EB-1 is of degree 1 and SB-1 is its only source block and the EB-2 is of degree 2 and source blocks are SB-1 and SB-2. Depending on the sizes of EB and EP, there are different ways to pack EBs into EPs. FIG. 6A illustrates one EB for each EP. There are also different decoding techniques for LT codes. The Belief Propagation and the Gaussian Elimination are two typical decoding method for LT codes.

Figure 6B:
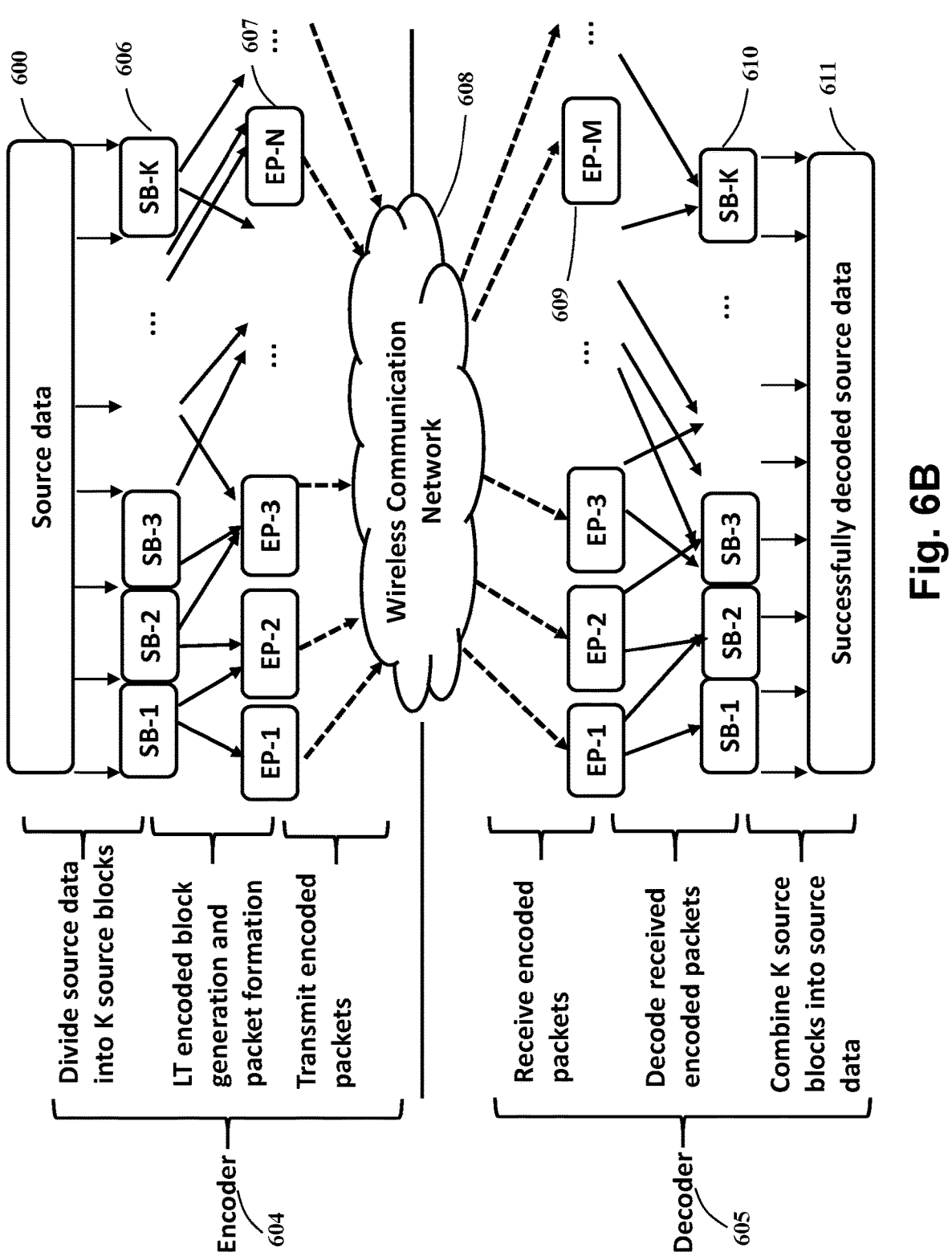
FIG. 6B illustrates the conventional Luby Transform based encoding and decoding processes over wireless communication networks.

FIG. 6B illustrates LT encoding and decoding process over wireless communication networks such as wireless IoT networks, where an encoder 604 performs a) source data splitting 606, b) source data encoding and encoded packet construction 607 and c) encoded packet transmission over a wireless communication network 608, and a decoder 605 performs a) encode packet receiving 609, b) encoded packet decoding 610 and c) source data construction 611. It should be noticed that for firmware/software distribution in multi-hop IoT networks, the network manager is a pure encoder, the data nodes with Class-U neighbor are both decoders and encoders, and the data nodes without Class-U neighbor are pure decoders.

Figures 7A, 7B:
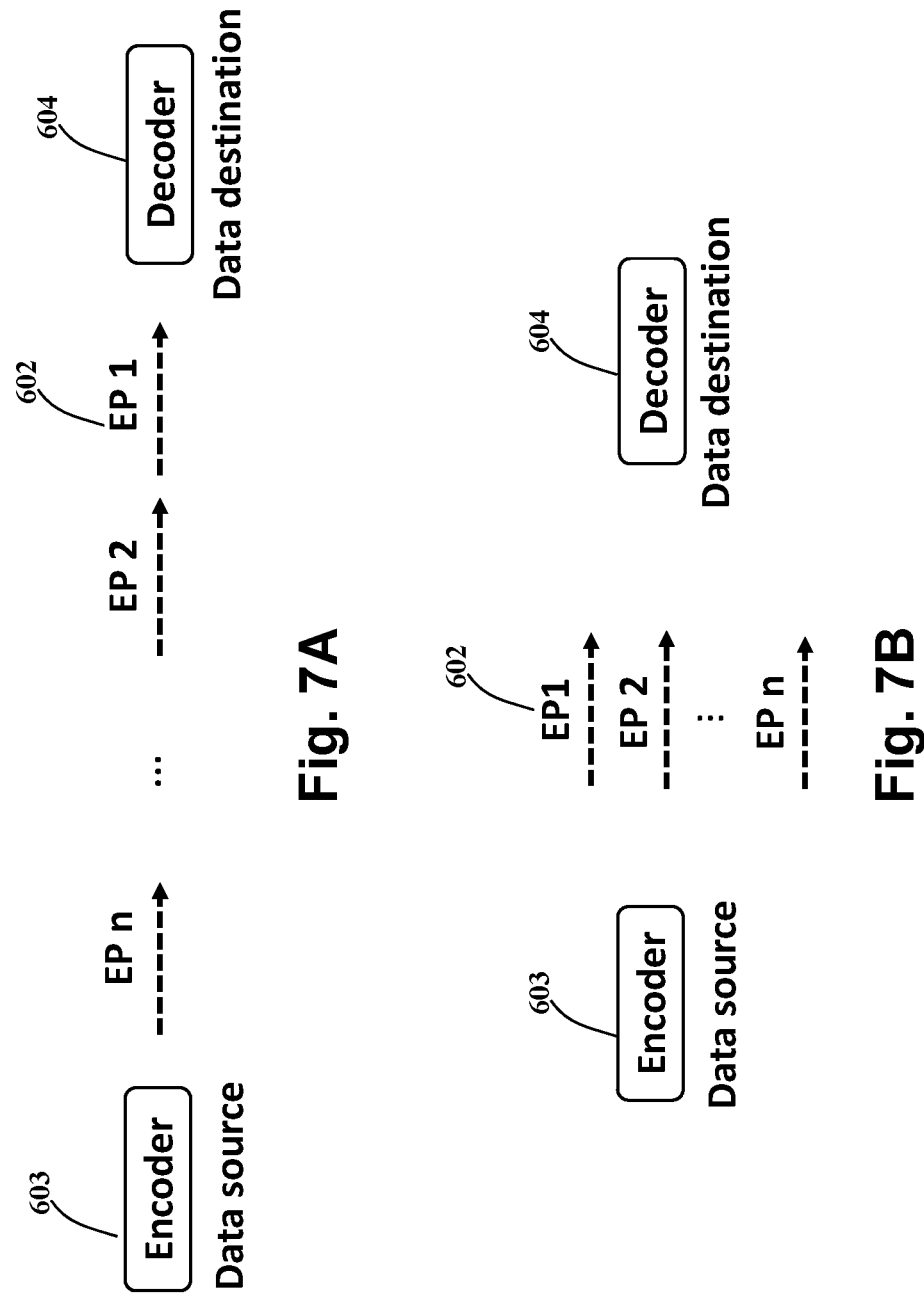
FIG. 7A shows the sequential unicast transmission of the encoded packets in conventional end-to-end coding mechanism.
FIG. 7B shows the parallel unicast transmission of the encoded packets in conventional end-to-end coding mechanism.

In conventional end-to-end LT coding, the encoded packets (EPs) 603 are transmitted either sequentially as shown in FIG. 7A or parallelly as shown in FIG. 7B depending on number of communication channels between encoder 604 and decoder 605. In conventional LT coding, the encoder continues the EP transmission until the decoder acknowledges. This can be serious issue in lossy wireless networks, where poor link could cause the encoder transmits infinite number of EPs due to the loss of acknowledgement, which is practically impossible to realize.

There are several issues to apply conventional LT coding technique to multi-hop broadcast network topology including (1) LT is designed for end-to-end topology with one encoder and one decoder only, (2) LT doesn't consider network conditions such as link quality, (3) LT doesn't take broadcast transmission into account where no acknowledgement is transmitted and (4) LT is not adaptive to network topology.

Figure 8:
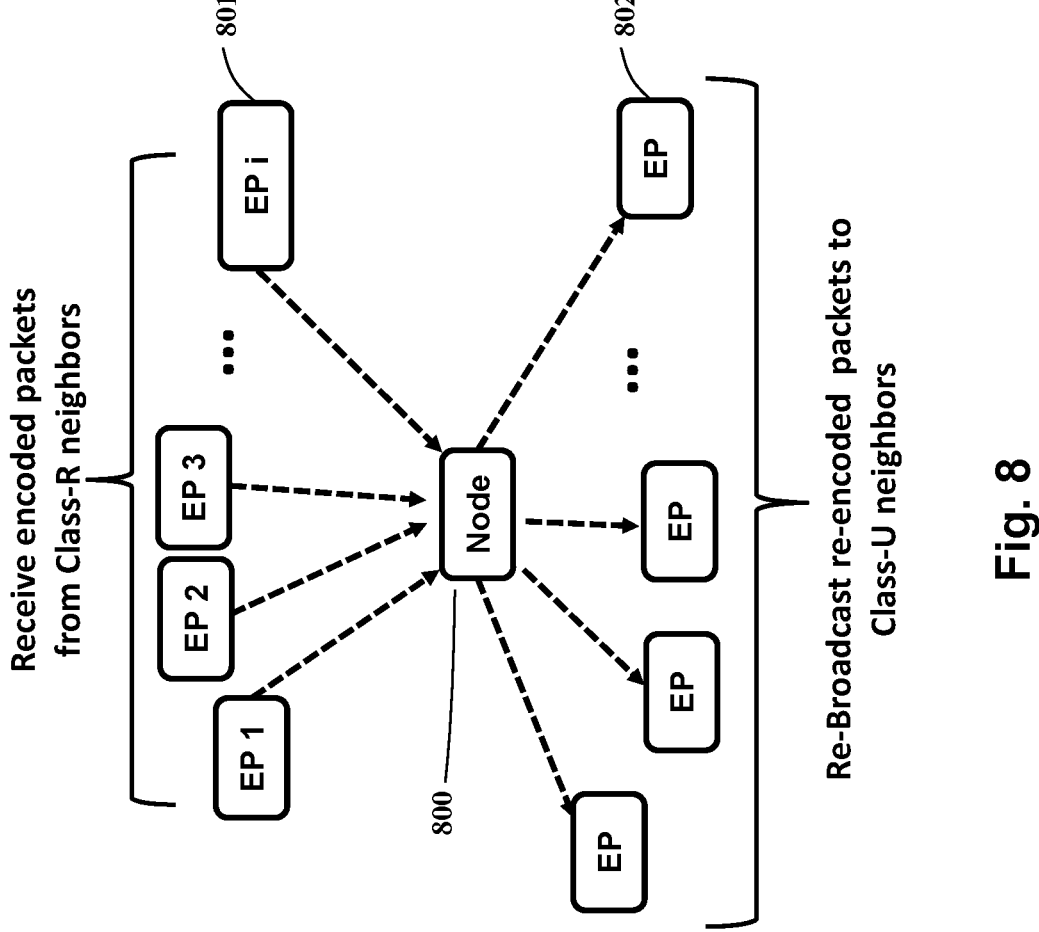
FIG. 8 demonstrates the multiple-in multiple-out broadcast transmission of the encoded firmware/software packets in multi-hop broadcasting networks according to some embodiments of an invention, where a node receives encoded firmware/software packets from different Class-R neighbors and then re-broadcasts the re-encoded firmware/ software packets to all Class-U neighbors.

The multi-hop broadcast transmission provides an opportunity to address these issues. As shown in FIG. 8, a node 800 in multi-hop broadcast networks can receive the EPs from multiple Class-R neighbors 801 and it also broadcast the EPs to neighbors 802 in both Class-R set and Class-U set. In such topology, all Class-R neighbors are encoders. As a result, a node is not necessary to receive all EPs from a single encoder. Instead, it can receive EPs from alternative encoders.

Figure 9:
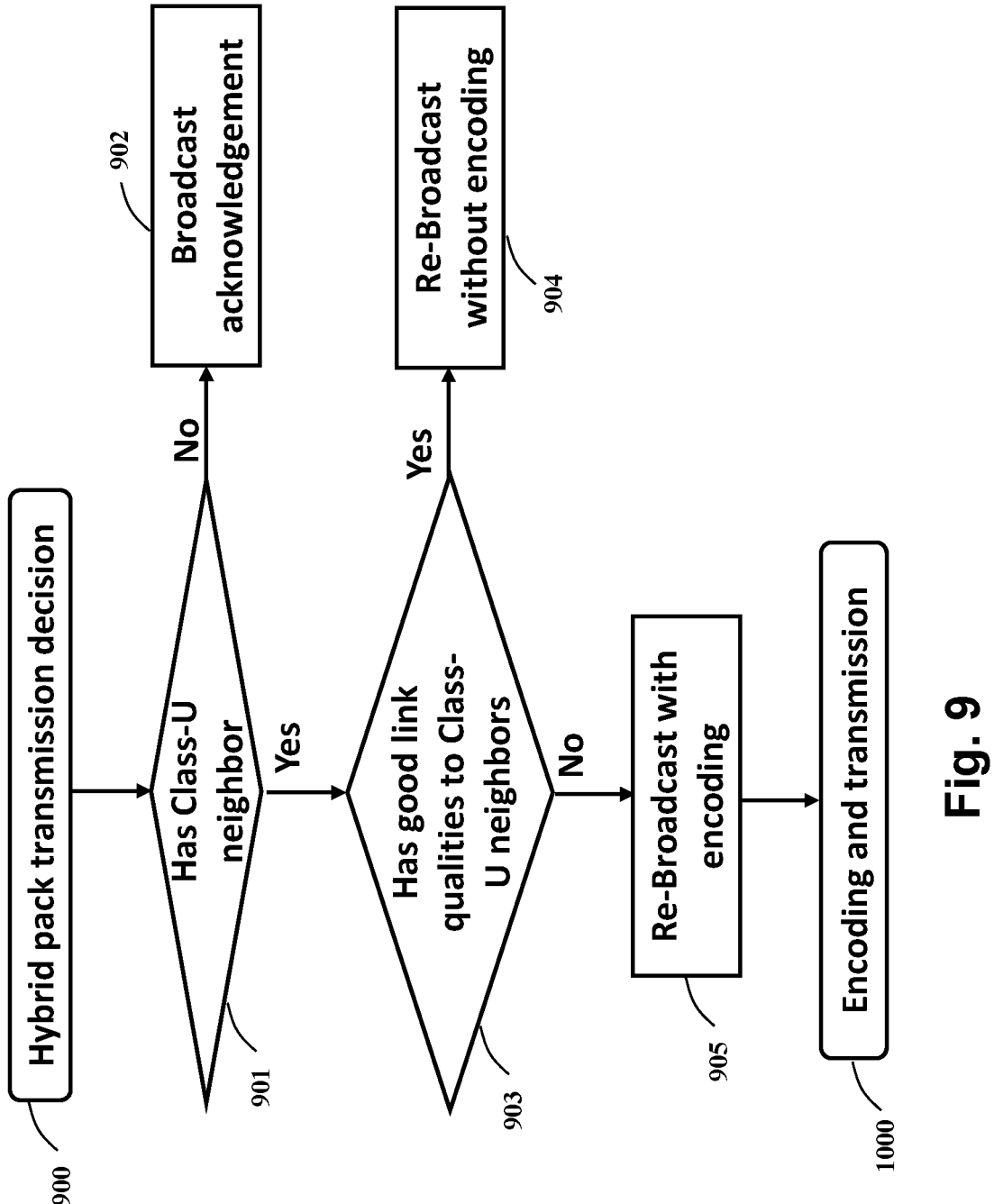
FIG. 9 depicts hybrid packet transmission decision making by a node in multi-hop IoT networks for firmware/ software distribution according to some embodiments of an invention.

Upon receiving firmware/software program, each data node first decides whether it needs to re-broadcast firmware/software program or not. FIG. 9 shows the provided hybrid packet transmission decision making 900 for firmware/software distribution in multi-hop IoT networks, in which a node does not re-broadcast firmware/software packets if it has no Class-U neighbor 901, instead it broadcasts an acknowledgement packet 902. Otherwise, the node needs to re-broadcast firmware/software program. The next step is to decide whether it needs to encode firmware/software packets or not 903. Although coding can improve transmission reliability, it adds redundancy as well. It has been shown that when the link quality is good enough, the simple transmission is more efficient than coding. Therefore, a good link quality threshold $Q_G$ can be defined. If a node has Class-U neighbor and the link qualities to all Class-U neighbors are above the threshold $Q_G$, the node re-broadcast firmware/software packets without encoding 904. Otherwise, if a node has Class-U neighbor and poor link quality to any Class-U neighbor, the node re-broadcast firmware/software packets with encoding 905 using the method 1000 as shown in FIG. 10A, where firmware/software program is the source data.

The determination of threshold $Q_G$ depends on the link quality representation such as ETX or RSSI. Take $0 \leq q_r(i) \leq 1$ for example, the $Q_G$ can be set to 0.9.

Figure 10A:
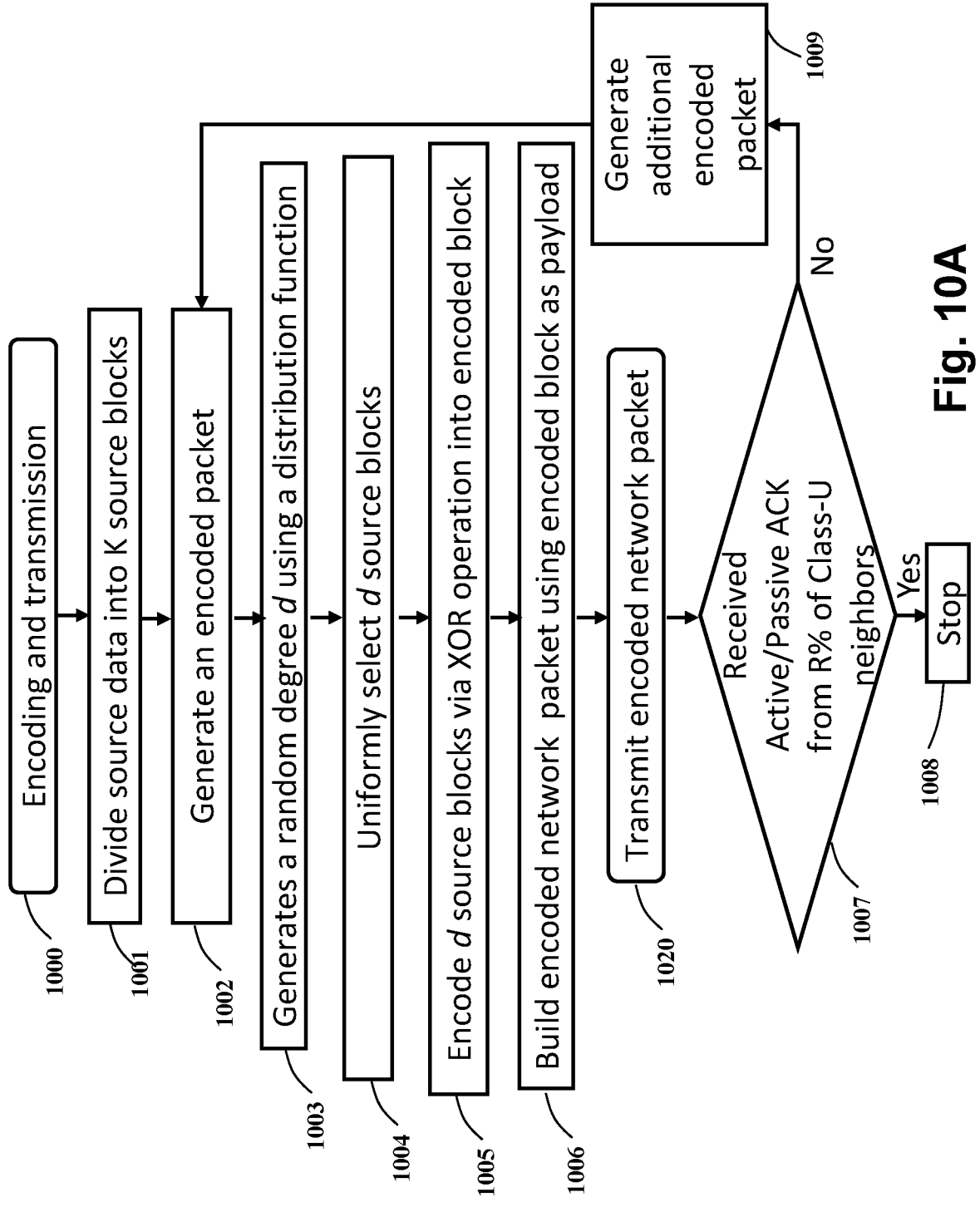
FIG. 10A shows the encoding and transmission process by the relay data nodes for firmware/software program distribution in multi-hop wireless IoT networks according to some embodiments of an invention.
Figure 10B:
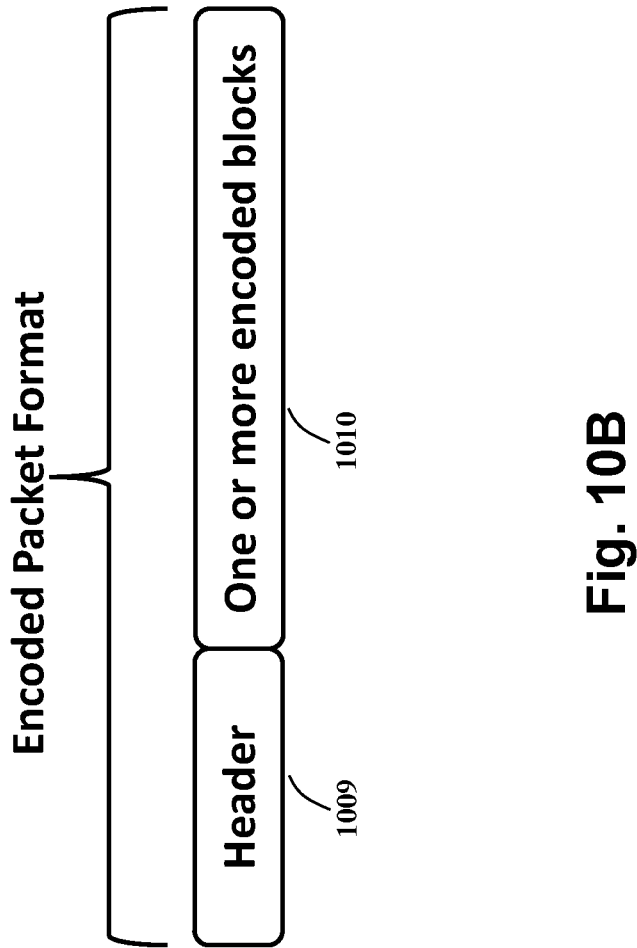
FIG. 10B illustrates the packet format for firmware/ software distribution in multi-hop wireless IoT networks according to some embodiments of an invention.

FIG. 10A depicts the provided encoding and transmission method 1000, in which a node n divides 1001 the firmware/software data into K blocks and then generates 1002 an encoded network packet. To do so, node n first generates 1003 a random degree d using an existing degree distribution function such as Robust Soliton Distribution. The node n then uniformly selects d source blocks 1004 and generates 1005 an encoded block using XOR operation. The encoded block is packed 1006 into encoded network packet as payload together with necessary header, e.g., the degree d and the source blocks used, to decode firmware/software data. The network packet format is illustrated in FIG. 10B consisting of packet header 1009 and packet payload 1010. The encoded packets are then broadcasted 1020 according to the multi-mode adaptive packet transmission process shown in FIG. 10C, where if a node is single-mode node 1021, it transmits the encoded packets 1022 using low transmission rate. Otherwise, if the node is multi-mode node and all Class-U neighbors are multi-mode nodes 1023, it transmits the encoded packets 1024 using high transmission rate. Otherwise, if any Class-U neighbor is single-mode node, it transmits the encoded packets 1025 using low transmission rate. Meantime, the node n monitors active and/or passive acknowledgements transmitted by its Class-U neighbors. If an R percent (R %) of Class-U neighbors received the firmware/software program 1007, the node n stops encoding and transmission 1008. Otherwise, the node n will generate and broadcast 1009 another encoded network packet. The determination of R % depends on number of Class-U neighbors, link qualities to Class-U neighbors and other parameters. For example, a receiving link quality threshold $Q_R$ can be defined such that for a Class-U neighbor i of node n, if the link quality $q_r(i) \geq Q_S$, the Class-U neighbor i can successfully receive packet from node n, otherwise the Class-U neighbor i may not successfully receive packet from node n due to the poor link quality. The R can then be computed as follows $$R(n) = \frac{N_G(n)}{N_U(n)}, \tag{2}$$

where $N_G(n)$ is number of Class-U neighbors for which the link quality $q_r(i) \geq Q_R$.

The determination of threshold $Q_R$ depends on the link quality representation such as ETX or RSSI. Take $0 \leq q_r(i) \leq 1$ for example, the $Q_R$ can be set to 0.6.

The R % stopping mechanism is to reduce redundant transmissions by considering multi-source reception in broadcast transmission. It also takes network condition into account, e.g., if a node has poor link qualities to some Class-U neighbors, it tends to add more redundancy to increase the possibility of successful decoding, yet the added redundancy may not help. Stopping transmission avoids the scenario where the link quality is extremely poor and thus packet arriving rate is very low.

In this case, keeping transmission consumes communication bandwidth without much gain. Stopping transmission gives other nodes opportunities to transmit, those nodes may have good link qualities to the poor link quality Class-U neighbors.

Figure 11A:
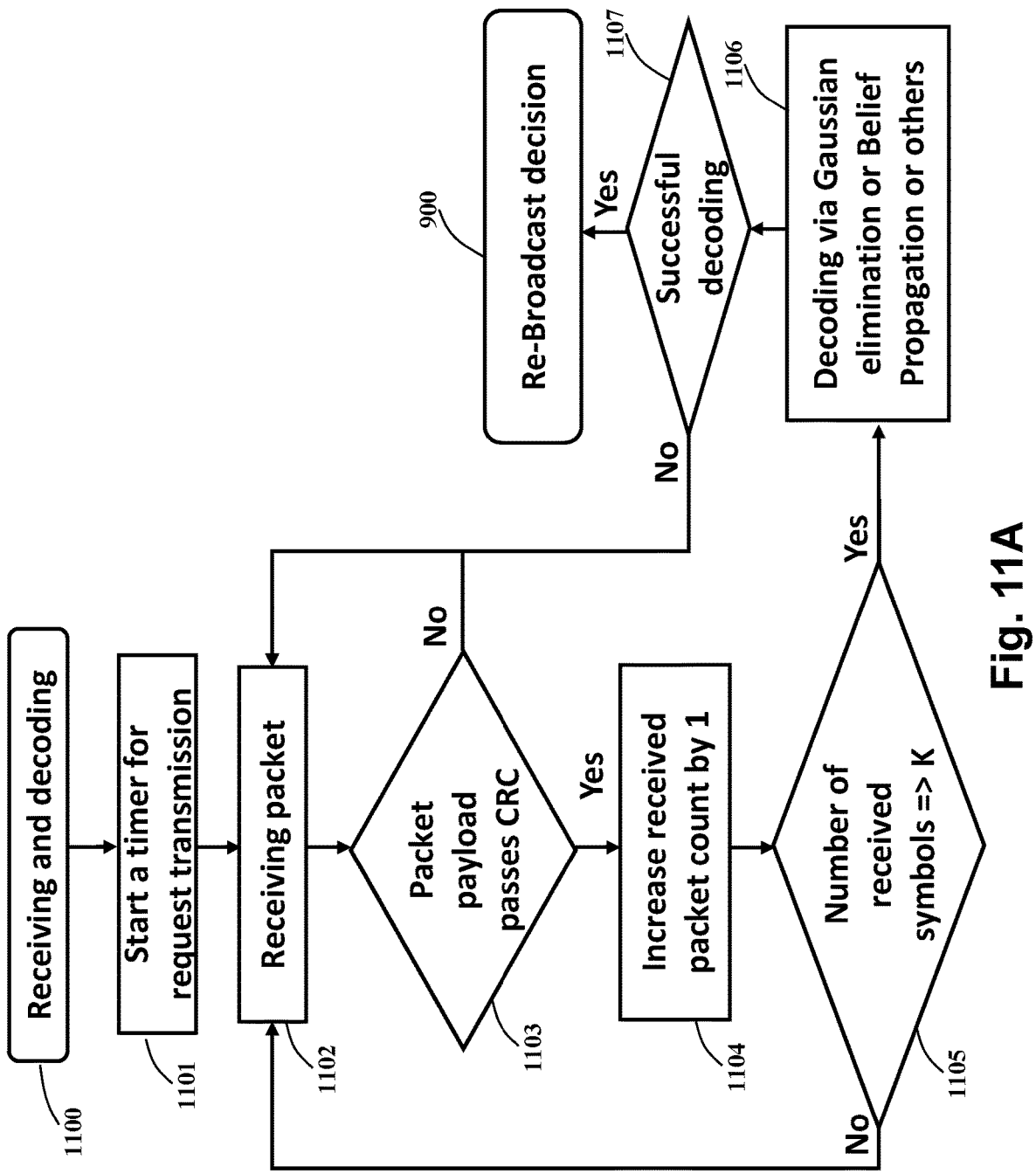
FIG. 11A depicts the receiving and decoding process by the data nodes for firmware/software distribution in multi-hop wireless IoT networks according to some embodiments of an invention.

FIG. 11A illustrates the provided receiving and decoding method 1100 for firmware/software distribution in multi-hop IoT networks, in which a data node first starts 1101 a timer to send re-transmission request. When an encoded packet is received 1102, the node first checks CRC 1103. If CRC check fails, the packet is dropped. Otherwise, the number of encoded packets received is increased 1104 by 1. If the number of received encoded packets is less than K 1105, the node n continues packet receiving 1102. Otherwise, the node applies a decoding method such as Gaussian Elimination or Belief Propagation to decode firmware/software program 1106. If the decoding successes 1107, the node makes re-broadcast decision 900 as shown in FIG. 9. Otherwise, the node continues packet receiving 1102.

Due to the hybrid transmission mechanism and multi-source reception, a data node may receive the encoded packets from some Class-R neighbors and receive the non-encoded packets from other Class-R neighbors. The non-encoded packets are treated as degree 1 encoded packets.

Figure 11B:
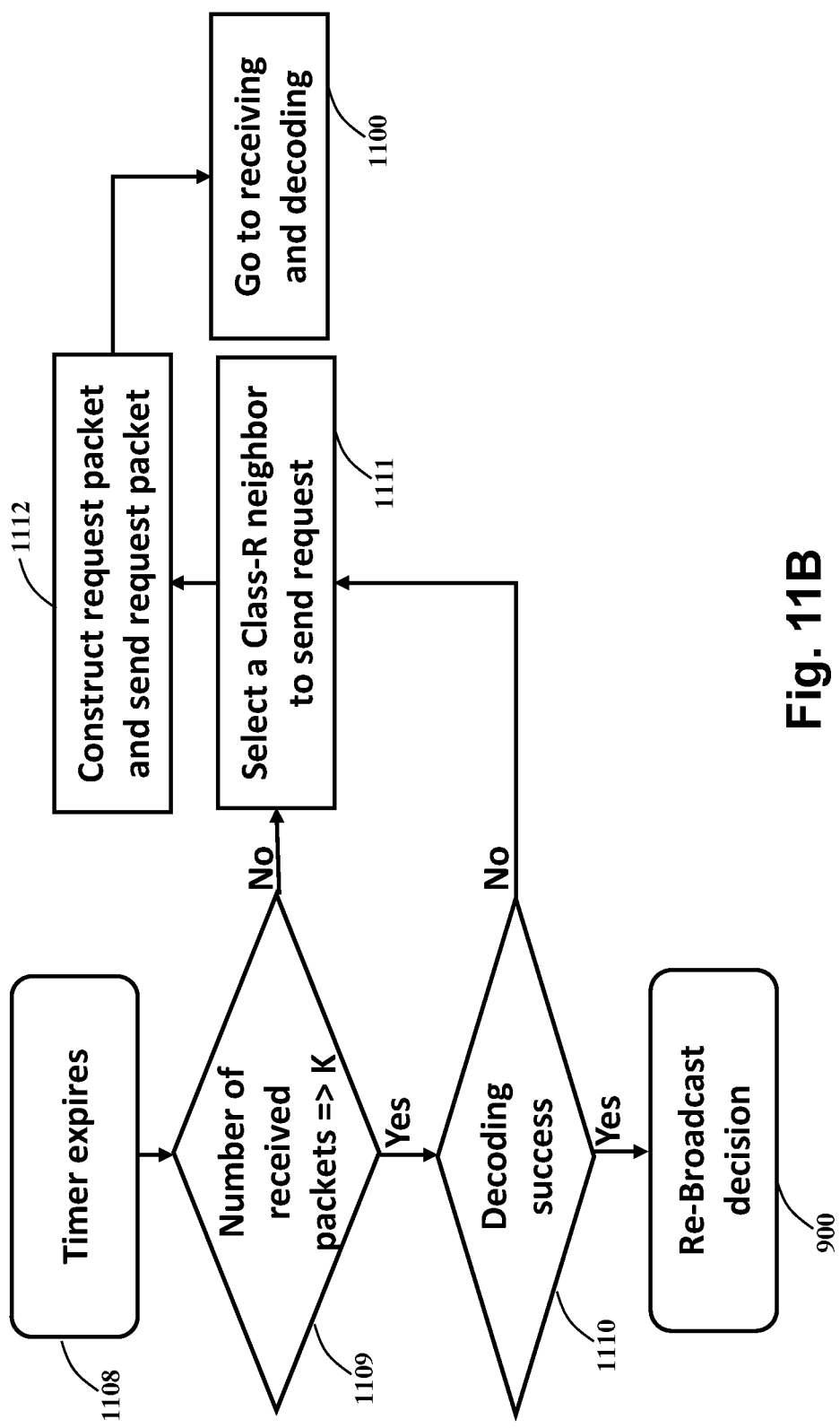
FIG. 11B shows timer handling mechanism in receiving and decoding process of firmware/software distribution in multi-hop wireless IoT networks according to some embodiments of an invention.

FIG. 11B shows the procedure to handle timer in receiving and decoding method shown in FIG. 11A. When the timer is up 1108, the node checks 1109 if the number of encoded packets received is greater than or equal to K. If no, the node goes to request sending process, in which the node selects 1111 a Class-R neighbor, constructs a request packet asking for missing blocks, sends request 1112 and goes to packet receiving 1100. Otherwise, the node checks if the decoding succeeded 1110. If yes, the node goes to re-broadcast decision process 900. If no, the node goes to request sending process.

There different ways to select a Class-R neighbor, e.g., selecting a Class-R neighbor with the best link quality, selecting RPL default parent if RPL routing protocol is realized, etc.

To send a request, a requester includes a re-transmission request vector 1200 into request packet to indicate missing source blocks. If the firmware/software program is divided into K source blocks, the re-transmission request vector 1200 is shown in FIG. 12A, in which the vector has K elements of bits, bit 1 indicates corresponding source block is requested and bit 0 indicates corresponding source block is not needed, e.g., in FIG. 12A, source block 3 and source block K−1 are requested.

Figures 12A, 12B:
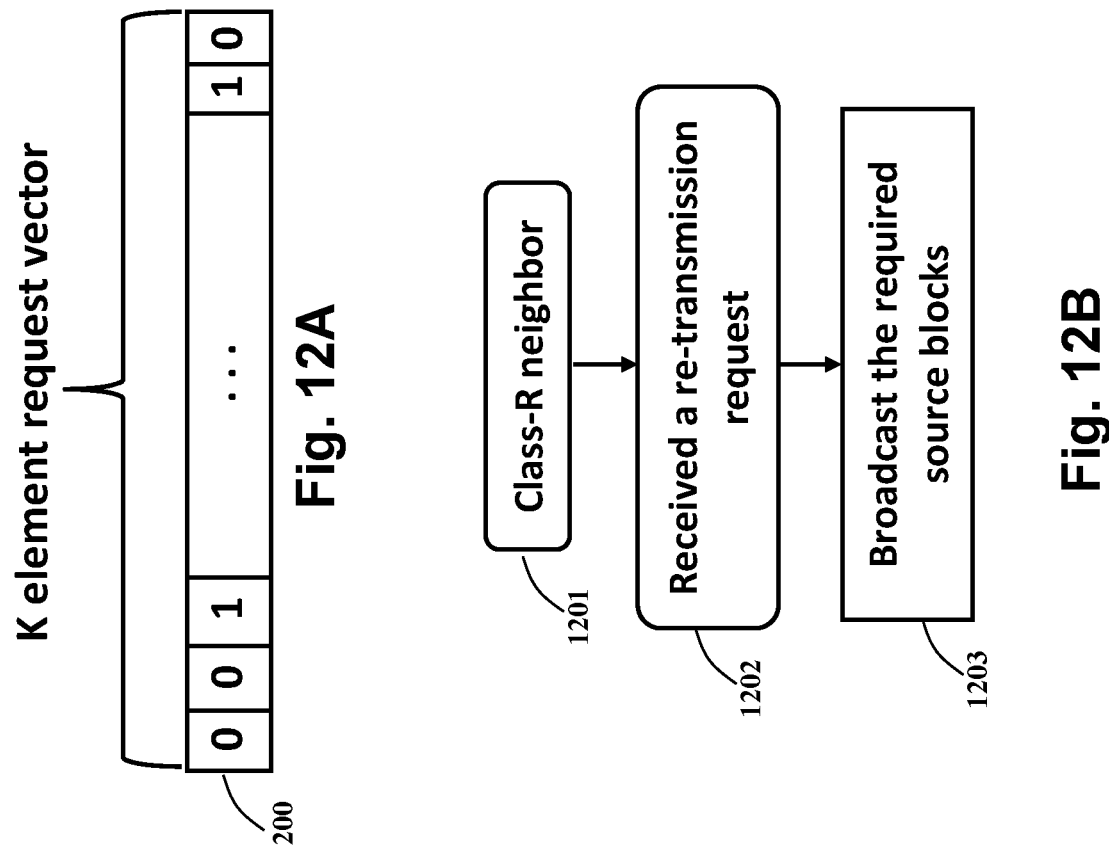
FIG. 12A illustrates re-transmission request vector for firmware/software distribution in multi-hop wireless IoT networks according to some embodiments of an invention.
FIG. 12B shows re-transmission request handling mechanism when a Class-R node receives a re-transmission request from a Class-U neighbor for firmware/software distribution in multi-hop wireless IoT networks according to some embodiments of an invention.

FIG. 12B depicts the re-transmission request handling method, in which when a Class-R node 1201 receives a re-transmission request packet 1202, it broadcasts 1203 the requested source blocks, which can be transmitted with or without encoding. Although the re-transmission request is unicasted, the re-transmission response is broadcasted so that other nodes may also need the source blocks requested.

Multi-Mode Operation for Firmware/Software Distribution in Multi-Hop IoT Networks It is common for multi-mode devices to be present in modern IoT networks. A high transmission rate link takes less time to transmit a packet than a low transmission rate link does. It should be noted that a high transmission rate link can formed by two multi-mode nodes. A multi-mode and a single-mode node can only form a low transmission rate link. Similarly, two single-mode nodes can only form a low transmission rate link.

Figure 10C:
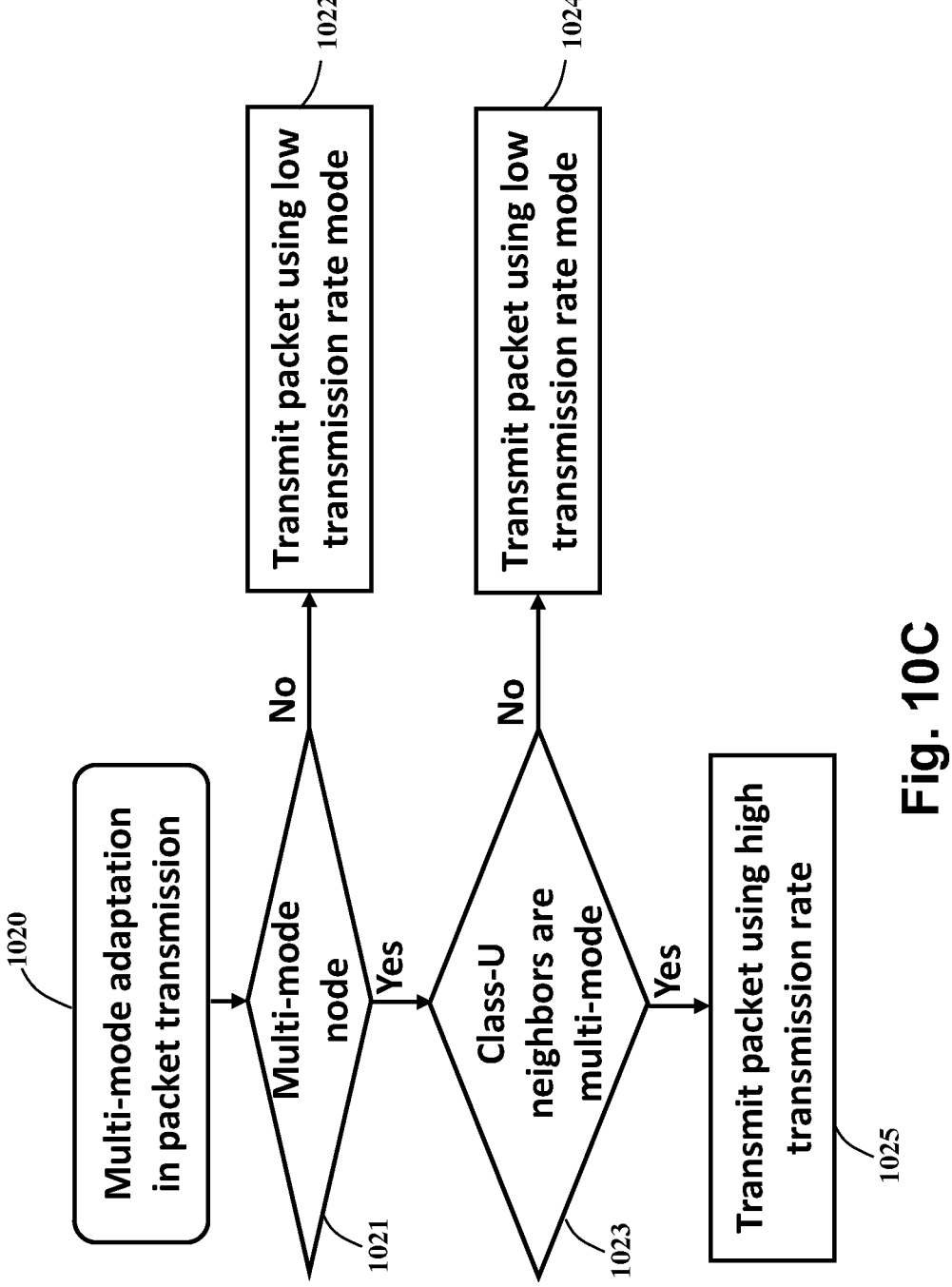
FIG. 10C illustrates multi-mode adaptive packet transmission in multi-hop wireless IoT networks consisting of multi-mode nodes and single-mode nodes according to some embodiments of an invention.

FIG. 10C shows the hybrid packet transmission process 1020, in which if a node is single-mode node 1021, it transmits firmware/software packets 1022 using low transmission rate. Otherwise, if a node is multi-mode node and all Class-U neighbors are multi-mode nodes 1023, the node transmits firmware/software packets 1024 using high transmission rate. Otherwise, if a node is multi-mode node and any Class-U neighbor is single-mode node, it transmits firmware/software packets 1025 using lower transmission rate.

We claim:

1. A network manager for delivering a firmware/software program to multi-mode nodes and single-mode nodes arranged in a multi-hop wireless IoT network, comprising:

a transceiver configured to perform wireless communication by transmitting encoded data packets of the firmware/software program to first-hop nodes, wherein the first-hop nodes are configured to directly communicate with the network manager, wherein other nodes except the first-hop nodes are named as other-hop nodes;

at least one processor in association with the transceiver; and a memory having the firmware/software program and instructions stored thereon that cause the at least one processor to:

divide the firmware/software program into firmware/software program source blocks; encode the firmware/software program source blocks into encoded blocks based on a rateless erasure coding scheme;

pack the encoded blocks into encoded data packets;

transmit, based on dynamic relay point (DRP) protocol, the encoded data packets to the first-hop nodes, wherein the first-hop nodes are configured to receive the encoded data packets, decode the encoded data packets received, re-encode the firmware/software program source blocks and re-transmit the encoded data packets to propagate firmware/software distribution to the other-hop nodes, wherein the network manager keeps broadcasting the encoded data packets to the first-hop nodes until an R percent (R %) of the first-hop nodes completes to receive a whole of the firmware/software program; and re-broadcast missing source blocks to the first-hop nodes in response to receiving a re-transmission request of the missing source blocks of the firmware/software program from the first-hop nodes.

2. The network manager of claim 1, wherein the network manager communicates with the multi-mode nodes and single-mode nodes in the multi-hop wireless IoT network, wherein the multi-mode nodes and single-mode nodes classify respective neighbor nodes into respective Class-R neighbors and Class-U neighbors, wherein the Class-R neighbors are neighbor nodes that have received a whole of the firmware/software program source blocks successfully decoded from the encoded data packets received, wherein the Class-U neighbors are neighbor nodes that have not received the whole of the firmware/software program source blocks, wherein the Class-U neighbors have at least one of the firmware/software program source blocks missing.

3. The network manager of claim 2, wherein the multi-mode nodes and single-mode nodes initially classify all respective neighbor nodes as the Class-U neighbors except the network manager, wherein the network manager is classified as a Class-R neighbor by the neighbor nodes of the network manager, wherein the Class-R neighbors and Class-U neighbors are dynamically updated as the firmware/software distribution proceeds.

4. The network manager of claim 3, wherein the multi-mode nodes and single-mode nodes dynamically update the Class-R neighbors and Class-U neighbors based on a hybrid acknowledgement method, wherein transmission of a firmware/software program source block serves as a passive acknowledgement, wherein transmission of a broadcast acknowledgement (ACK) packet serves as an active acknowledgement, wherein each of the multi-mode nodes and single-mode nodes re-classifies a Class-U neighbor into a Class-R neighbor upon receiving the passive acknowledgement or the active acknowledgement from the Class-U neighbor.

5. The network manager of claim 4, wherein upon receiving the whole of firmware/software program source blocks successfully decoded from the encoded data packets received, the multi-mode nodes and single-mode nodes re-transmit the firmware/software program source blocks based on a hybrid pack transmission decision, wherein the multi-mode nodes and single-mode nodes re-transmit the firmware/software program source blocks only if there are Class-U neighbors, wherein if there are no Class-U neighbors, the multi-mode nodes and single-mode nodes broadcast an acknowledgement packet.

6. The network manager of claim 5, wherein a good link quality threshold $Q_G$ is defined such that the multi-mode nodes and single-mode nodes re-transmit the firmware/software program source blocks without encoding if link qualities of the multi-mode nodes and single-mode nodes to the respective Class-U neighbors are greater than the good link quality threshold $Q_G$, wherein if the link qualities of the multi-mode nodes and single-mode nodes to the respective Class-U neighbors are equal to or less than the good link quality threshold $Q_G$, the multi-mode nodes and single-mode nodes re-transmit the encoded firmware/software program source blocks.

7. The network manager of claim 6, wherein the good link quality threshold $Q_G$ is defined based on link quality representation.

8. The network manager of claim 1, wherein the multi-mode nodes and single-mode nodes stop transmitting the firmware/software program source blocks if the R % of Class-U neighbors have received the whole of the firmware/software program source blocks.

9. The network manager of claim 1, wherein the multi-mode nodes and single-mode nodes start a timer when receiving a first firmware/software program source block, wherein when the timer is up and if the multi-mode nodes and single-mode nodes have not received the whole of the firmware/software program source blocks, each of the multi-mode nodes and each of the single-mode nodes send a re-transmission request to a selected Class-R neighbor, wherein the re-transmission request contains a re-transmission request vector of bits with bit 1 indicating corresponding source block is requested and bit 0 indicating corresponding source block is not needed.

10. The network manager of claim 9, wherein when a Class-R neighbor has a best link quality or when the Class-R neighbor is a default parent node in a routing protocol, the Class-R neighbor is selected for the re-transmission request.

11. The network manager of claim 1, wherein the multi-mode nodes and single-mode nodes are prioritized into early-nodes and late-nodes, wherein the early-nodes attempt to re-transmit the firmware/software program source blocks earlier, wherein the late-nodes attempt to re-transmit the firmware/software program source blocks later.

12. The network manager of claim 11, wherein the early-nodes are defined as having more Class-U neighbors and maintaining good link qualities to Class-U neighbors, wherein the late-nodes are defined as having less Class-U neighbors or poor link qualities to Class-U neighbors.

13. The network manager of claim 12, wherein a multi-mode node or a single-mode node n re-transmits the firmware/software program source blocks with a delay D(n) computed according to $$D(n) = \frac{\text{Time unit}}{N_U(n) * \sum_{i=1}^{N_U} q_t(i)},$$

where the time unit is microseconds (μs) or milliseconds (ms), wherein $N_u(n)$ is a number of Class-U neighbors n and $q_t(i)$ is a link quality from the multi-mode node or the single-mode node n to its Class-U neighbor i at time t.

14. The network manager of claim 1, wherein for a Class-U neighbor i of node n, a receiving link quality threshold $Q_R$ is defined such that if a link quality $q_t(i) \geq Q_R$, the Class-U neighbor i successfully receives a packet from the node n, wherein the R % is computed based on a number of Class-U neighbors, the link quality to Class-U neighbor at time t, and the receiving link quality threshold $Q_R$ as $$R(n) = \frac{N_G(n)}{N_U(n)},$$

where $N_G(n)$ is the number of Class-U neighbors of the node n for which the link quality $q_t(i) \geq Q_R$ at time t.

15. A multi-mode node for delivering a firmware/software program over a multi-hop wireless IoT network including a network manager, other multi-mode nodes and single mode nodes, comprising:

a transceiver configured to perform wireless communication with neighbors including the network manager, the other multi-mode nodes and the single mode nodes by receiving encoded packets of the firmware/software program from the network manager and transmitting encoded firmware/software program source blocks to the other multi-mode nodes and the single mode nodes;

at least one processor in association with the transceiver; and a memory having instructions stored thereon that cause the at least one processor to:

classify the neighbors into Class-R neighbors and Class-U neighbors, wherein the Class-R neighbors are neighbor nodes that have received a whole of the encoded packets of the firmware/software program, wherein the Class-R neighbors are neighbor nodes that have received a whole of firmware/software program source blocks successfully decoded from the encoded source blocks received, wherein the Class-U neighbors are neighbor nodes that have not received the whole of the firmware/software program source blocks, wherein the Class-U neighbors have at least one of the firmware/software program source blocks missing, wherein all neighbors except the network manager are initially classified as the Class-U neighbors, wherein the network manager is classified as a Class-R neighbor by its neighbors, wherein the at least one processor re-classifies the Class-U neighbors into the Class-R neighbors based on an hybrid acknowledgement method.

16. The multi-mode node of claim 15, wherein the other multi-mode nodes perform mode adaptive packet transmission such that if all the Class-U neighbors of the other multi-mode nodes are multi-mode nodes, the other multi-mode nodes transmit the encoded firmware/software program source blocks using high transmission rate mode, otherwise, the other multi-mode nodes transmit the encoded firmware/software program source blocks using low transmission rate mode.

17. The multi-mode node of claim 15, wherein the other multi-mode nodes are prioritized into early-nodes and late-nodes, wherein the multi-mode node receives, decodes, re-encodes the firmware/software program source blocks based on a rateless erasure coding scheme using the at least one processor, and re-transmits the re-encoded firmware/software program source blocks, using dynamic relay point (DRP) protocol earlier than the late-nodes do.

18. The multi-mode node of claim 15, wherein the early-nodes are defined as having more Class-U neighbors and maintaining good link qualities to Class-U neighbors, wherein the late-nodes are defined as having less Class-U neighbors or poor link qualities to Class-U neighbors.

19. The multi-mode node of claim 15, wherein the multi-mode node transmits, in response to a re-transmission request of missing firmware/software source blocks from a request node having failed to receive the whole of the firmware/software program source blocks, to the request node.

20. The multi-mode node of claim 15, wherein the at least one processor receives, via the transceiver, a re-transmission request of missing firmware/software source blocks from a request node having failed to receive the whole of the firmware/software program source blocks, wherein the at least one processor re-broadcasts the missing firmware/software source blocks to neighbors including the request node.

\* \* \* \* \*